(12) United States Patent
Trudel et al.

(10) Patent No.: US 9,803,287 B2
(45) Date of Patent: Oct. 31, 2017

(54) ELECTROCATALYTIC MATERIALS AND METHODS FOR MANUFACTURING SAME

(71) Applicant: Click Materials Corp., Vancouver, British Columbia (CA)

(72) Inventors: Simon Trudel, Calgary (CA); Curtis Berlinguette, Calgary (CA)

(73) Assignee: Click Materials Corp., Vancouver (CA)

( * ) Notice: Subject to any disclaimer, the term of this patent is extended or adjusted under 35 U.S.C. 154(b) by 0 days.

(21) Appl. No.: 15/255,400

(22) Filed: Sep. 2, 2016

(65) Prior Publication Data

US 2016/0369410 A1    Dec. 22, 2016

Related U.S. Application Data

(62) Division of application No. 14/342,610, filed as application No. PCT/CA2012/050609 on Sep. 4, 2012, now Pat. No. 9,433,928.

(Continued)

(51) Int. Cl.
*C25B 1/00* (2006.01)
*C25B 1/04* (2006.01)
(Continued)

(52) U.S. Cl.
CPC ............ *C25B 1/003* (2013.01); *B01J 23/745* (2013.01); *B01J 23/75* (2013.01); *B01J 23/755* (2013.01);
(Continued)

(58) Field of Classification Search
CPC ... B01J 21/00; B01J 21/04; B01J 21/06; B01J 21/08; B01J 21/12; B01J 23/745; B01J 23/755; B01J 23/75; B01J 23/10; B01J 23/14; B01J 23/20; B01J 23/28; B01J 23/34; B01J 23/70; B01J 23/72;
(Continued)

(56) References Cited

U.S. PATENT DOCUMENTS 3,853,790 A    12/1974 Vosolsobe et al.
4,729,889 A    3/1988 Flytani-Stephanopoulos et al.
(Continued)

FOREIGN PATENT DOCUMENTS

CN    1382229 A    11/2002
CN    101386432 A    3/2009
(Continued)

OTHER PUBLICATIONS

Yang, J. et al., "Nanoporous amorphous manganese oxide as eletrocatalyst for oxygen reduction in alkaline solutions", Electrochemistry Communications, (Apr. 1, 2003), vol. 5, No. 4, pp. 306-311.
(Continued)

*Primary Examiner* — Cam N. Nguyen
(74) *Attorney, Agent, or Firm* — Scully Scott Murphy and Presser

(57) ABSTRACT

The present invention provides an electrocatalytic material and a method for making an electrocatalytic material. There is also provided an electrocatalytic material comprising amorphous metal or mixed metal oxides. There is also provided methods of forming an electrocatalyst, comprising an amorphous metal oxide film.

9 Claims, 28 Drawing Sheets

Related U.S. Application Data

(60) Provisional application No. 61/530,289, filed on Sep. 1, 2011, provisional application No. 61/581,303, filed on Dec. 29, 2011.

(51) Int. Cl.

| | |
|---|---|
| C25B 11/04 | (2006.01) |
| C01B 13/18 | (2006.01) |
| C01G 49/00 | (2006.01) |
| C01G 49/06 | (2006.01) |
| C01G 51/00 | (2006.01) |
| C01G 53/00 | (2006.01) |
| C10G 55/00 | (2006.01) |
| B01J 21/00 | (2006.01) |
| B01J 21/04 | (2006.01) |
| B01J 21/06 | (2006.01) |
| B01J 21/08 | (2006.01) |
| B01J 21/12 | (2006.01) |
| B01J 23/10 | (2006.01) |
| B01J 23/14 | (2006.01) |
| B01J 23/20 | (2006.01) |
| B01J 23/28 | (2006.01) |
| B01J 23/34 | (2006.01) |
| B01J 23/72 | (2006.01) |
| B01J 23/74 | (2006.01) |
| B01J 23/745 | (2006.01) |
| B01J 23/75 | (2006.01) |
| B01J 23/755 | (2006.01) |
| B01J 23/76 | (2006.01) |
| B01J 23/83 | (2006.01) |
| B01J 23/835 | (2006.01) |
| B01J 23/88 | (2006.01) |
| B01J 37/02 | (2006.01) |
| B01J 37/08 | (2006.01) |
| B01J 37/12 | (2006.01) |
| C01G 55/00 | (2006.01) |
| H01M 4/90 | (2006.01) |

(52) U.S. Cl.
CPC ............ *C01B 13/18* (2013.01); *C01B 13/185* (2013.01); *C01G 49/0018* (2013.01); *C01G 49/0045* (2013.01); *C01G 49/0054* (2013.01); *C01G 49/0072* (2013.01); *C01G 49/06* (2013.01); *C01G 51/40* (2013.01); *C01G 53/40* (2013.01); *C01G 55/002* (2013.01); *C25B 1/04* (2013.01); *C25B 11/04* (2013.01); *C25B 11/0452* (2013.01); *C25B 11/0484* (2013.01); *H01M 4/9016* (2013.01); *Y02E 60/366* (2013.01)

(58) Field of Classification Search
CPC ... B01J 23/74; B01J 23/76; B01J 23/83; B01J 23/835; B01J 23/88; B01J 37/0219; B01J 37/0225; B01J 37/0226; B01J 37/08; B01J 37/12; C25B 1/00; C25B 1/04; C25B 11/04; C25B 11/0452; C25B 11/0484; C01B 13/18; C01B 13/185; C01G 49/0018; C01G 49/0045; C01G 49/0054; C01G 49/0072; C01G 49/06; C01G 51/40; C01G 53/40; C01G 55/002
USPC ....... 502/104, 240, 255, 258–260, 263, 304, 502/310, 311, 314–316, 318, 324, 326, 502/327, 329, 331, 332, 335–338, 345, 502/346, 352–355, 439
See application file for complete search history.

(56) References Cited

U.S. PATENT DOCUMENTS

| | | |
|---|---|---|
| 5,461,022 A | 10/1995 | Dosch et al. |
| 5,534,312 A | 7/1996 | Hill et al. |
| 5,897,958 A | 4/1999 | Yamada et al. |
| 6,204,203 B1* | 3/2001 | Narwankar ....... H01J 37/32862 438/785 |
| 6,218,049 B1 | 4/2001 | Bates et al. |
| 6,319,876 B1 | 11/2001 | Maier |
| 6,372,119 B1 | 4/2002 | Ray et al. |
| 6,458,431 B2 | 10/2002 | Hill et al. |
| 6,566,276 B2* | 5/2003 | Maloney ............... G03F 7/0042 257/E21.024 |
| 6,583,085 B1 | 6/2003 | Nakayama et al. |
| 6,589,453 B1* | 7/2003 | Saitoh ..................... C01B 13/18 264/115 |
| 6,660,632 B2 | 12/2003 | Hill et al. |
| 6,696,363 B2 | 2/2004 | Lee et al. |
| 6,723,388 B2 | 4/2004 | Svendsen et al. |
| 6,787,198 B2 | 9/2004 | Mukherjee et al. |
| 6,797,338 B2* | 9/2004 | Saitoh ..................... C01B 13/18 219/121.85 |
| 6,800,570 B2* | 10/2004 | Choi ..................... C23C 16/405 257/E21.274 |
| 6,833,089 B1 | 12/2004 | Kawahara et al. |
| 6,849,305 B2 | 2/2005 | Bravo-Vasquez et al. |
| 6,884,752 B2 | 4/2005 | Andrews |
| 6,936,143 B1 | 8/2005 | Graetzel et al. |
| 6,939,825 B1 | 9/2005 | Ohno et al. |
| 7,067,346 B2* | 6/2006 | Hill ....................... G03F 7/0042 257/E21.024 |
| 7,074,640 B2 | 7/2006 | Maloney et al. |
| 7,119,046 B2 | 10/2006 | Ohno et al. |
| 7,176,114 B2 | 2/2007 | Hill et al. |
| 7,217,669 B2* | 5/2007 | Choi ..................... C23C 16/405 257/E21.274 |
| 7,271,334 B2 | 9/2007 | Gratzel et al. |
| 7,462,578 B2 | 12/2008 | Hiraoka et al. |
| 7,994,053 B2 | 8/2011 | Park et al. |
| 8,357,271 B2 | 1/2013 | Morimitsu |
| 8,404,613 B2 | 3/2013 | Adzic et al. |
| 8,481,106 B2* | 7/2013 | Mukherjee ............... H01G 4/10 29/25.41 |
| 8,486,753 B2 | 7/2013 | Park et al. |
| 8,557,484 B2 | 10/2013 | Debe et al. |
| 2002/0197415 A1 | 12/2002 | Bravo Vasquez et al. |
| 2004/0166340 A1* | 8/2004 | Cairns .................. B01D 53/945 428/472 |
| 2005/0285312 A1 | 12/2005 | Fury et al. |
| 2008/0003503 A1 | 1/2008 | Kawakami et al. |
| 2008/0053580 A1 | 3/2008 | Drillet et al. |
| 2009/0065352 A1 | 3/2009 | Kitsuka et al. |
| 2010/0101955 A1 | 4/2010 | Nocera et al. |
| 2010/0133111 A1 | 6/2010 | Nocera et al. |

FOREIGN PATENT DOCUMENTS

| | | |
|---|---|---|
| JP | 2002-154825 A | 5/2002 |
| WO | WO 01/31085 A2 | 5/2001 |
| WO | WO 01/95690 A1 | 12/2001 |
| WO | WO 2011/027939 A1 | 3/2011 |
| WO | WO 2011/028262 A2 | 3/2011 |
| WO | WO 2011/028264 A2 | 3/2011 |
| WO | WO 2011/070908 A1 | 6/2011 |
| WO | WO 2011/087176 A1 | 7/2011 |
| WO | WO 2012/133136 A1 | 10/2012 |

OTHER PUBLICATIONS

Woodhouse, M. et al., "Combinatorial Approach to Identification of Catalysts for the Photoelectrolysis of Water", Chem. Mater. (Aug. 1, 2005), vol. 17, No. 17, pp. 4318-4324.

Zhu, H.J. et al., "The photochemical metal organic deposition of manganese ocide films from films of manganese(II) 2-eithylhexano-

(56) References Cited

OTHER PUBLICATIONS ate: a mechanistic study", Journal of Non-Crystalline Solids, (Nov. 1, 2002), vol. 31, No. 2, pp. 174-184.
Silva, A.C. et al., "Nb-containing hematites Fe2-xNbxO3: The role of Nb5+ on the reactivity in presence of the H2O2 or ultraviolet light", Applied Catalysis A: General, (Mar. 21, 2009), vol. 357, No. 1, pp. 79-84.
European Search Report dated Jun. 25, 2015 issued in corresponding European Patent Application No. 12829039.2.
Aroutiounian, V. M. et al., "Semiconductor photoanodes in the system Fe2—O3—Nb2O5 for photoelectrochemical water splitting" SPIE 6340 63400M-12, 12 pages, (2006).
Avey, A. A. et al., "Solid State Photochemistry of Cu2(OH2)2(o2C(CH2)4CH3)4 in Thin Films" The Photochemical Formation of high-Quality Films of Copper and Copper(J) Oxide. Demostration of a Novel Lithographic Technique for the Patterning of Copper J. Am. Chem. Soc. 118(1) 237-238 and Supplemental pp. 1-3 (1996).
Bocca, C. et al., "Nickel-cobalt oxide-coated electrodes: influence of the preparation technique on oxygen evolution reaction (OER) in an alkaline solution" International Journal of Hydrogen Energy 24:21-26 (1999).
Bocca, C. et al., "Oxygen evolution on Co3O4 and Li-doped Co3O4 coated electrodes in an alkaline solution" International Journal of Hydrogen Energy 24:699-07 (1999).
Buono-Core, G.E. et al., "Nickel Tropolonate Complexes as Precursors for the Direct Photodeposition of NiO Thin Films." J. Chil. Chem. Soc. 49(3):223-226 (2004) http://www.scielo.cl/scileo/php?script=sci_arttext&pid=S0717-9707200400300006&ing=es&nm=iso&ting=en accessed Jan. 29, 2015, 8 pages.
Castro, E. B. et al., "Oxygen evolution on electrodeposited cobalt oxides" Journal of Applied Electrochemistry 28:835-841 (1998).
Cruz, J.C. et al. "Nanosized IrO2 electrocatalysts for oxygen evolution reaction in SPE electrolyzer" J. Nanopart Res 13:1639-1646 (2011).
Dinca, M. et al., "Nickel-borate oxygen-evolving catalyst functions under benign conditions" PNAS 107 (23):10337-10341 and Supporting Information pp. 1-3(2010).
Gerken, B. et al., "Electrochemical Water Oxidation with Cobalt-Based Electrocatalysts from pH 0-14: The Thermodynamic Basis for Catalyst Structure, Stability, and Activity" J. Am. Chem. Soc. 133:14431-14442 and S1-S12 (2011).
Ghany, N.A. A. et al., "Oxygen evolution anodes composed of anodically deposited Mn—Mo—Fe oxides for seawater electrolysis" Electrochimica Acta 24:21-28 (2002).
Gorlin, Y. et al., "Catalytic oxygen reduction and evolution on manganese oxide surfaces" (2010)—abstract only http://abstracts.acs.org/chem.239nm/program/view.php?obj_id=7296&terms= accessed Jan. 29, 2015, 1 page.
Hu C., et al. "Effects of the nickel oxide on the hydrogen evolution and para-nitroaniline reduction at Ni-deposited graphite electrodes in NaOH" Electrochimica Acta 43(12-13): 1747-1756 (1998).
Jin-Zhen, B. et al., "Preparation of the Ni/NiCo2O4 Composite Electrode and Its Properties toward the Oxygen Evolution Reaction in Alkaline Media" Acta-Phys.—Chim. Sin. 27(12):2846-2856 (2011) translation of English language abstract on p. 2849.
Kanan, M. W. et al. "In Situ Formation of an Oxygen-Evolving Catalyst in Neutral Water Containing Phosphate and Co2+"Science 321: 1072-1075 and S2-S12 (18 pages in total) (2008).
Kleiman-Shwarsctein, A. et al., "Electrodeposition of alpha-FE2O3 Doped with Mo or Cr as Photoanodes for Photocatalytic Water Splitting" J. Phys. Chem. 112:15900-15907, Tables S1-S3, Figures S1-S2 (2008).
Li, X. et al, "Nickel based electrocatslysts for oxygen evolution in high current density, alkaline water electrolysers" Phys. Chem. Chem. Phys. 13: 1162-1167 (2011).
Lyons, M. E. G. et al., "Redox switching and oxygen evolution electrocatalysts in polymeric iron oxyhydroxide films" Phys. Chem. Chem. Phys. 11:2203-2217 (2009).
Lyons, M.E.G., et al."Enhanced Oxygen Evolution at Hydrous Oxy-Hydroxide Modified Iron Electrodes in Aqueous Alkaline Solution." Int. J. Electrochem. Sci. 6:5710-5730 (2011).
Lyons, M.E.G., et al. "A comparative study of the oxygen evolution reaction on oxidised nickel, cobalt and iron electrodes in base" Journal of Electroanalytical Chemistry 64:119-130(2010).
Lyons, M.E.G., et al. "Redox switching and oxygen evolution at oxidized metal and metal oxide electrodes: iron in base" Phys. Chem. Chem. Phys. 13:21530-21551 and 8 pages of Electronic Supplemental Material (2011).
Musiani, M. et al., "Oxygen evolution reaction at composite anodes containing Co3O4 particles Comparison of metal-matrix and oxide-matrix composites" Electrochimica Acta 44:1499-1507 (1998).
Nakagawa, T., et al., "Efficient Electro-Oxidation of Water near Its Reversible Potential by a Mesoporous IrOx Nanoparticle Film" The Journal of Physical Chemistry Letters 113:12958-12961 and S-1-S-10 (2009).
Schmidt, T. et al., "Electrocatalysis of Cathodic Hydrogen and Anodic Oxygen Evolution in Alkaline Water Electrolysis by In Situ Activation Procedures" Electrochimica Acta 39 (11/12: 1768-1767 (1994).
Singh, N.K. et al. "Electrocatalytic properties of spinel-type MxxFe3-x O4 synthesized below 100C for oxygen evolution in KOH solutions" J. Chem. Soc. Faraday Trans. 92(13):2397-2400 (1996).
Singh, S. P. et al., "Preparation of Thin Co3O4 Films on Ni and Their Electrocatalytic Surface Properties Towards Oxygen Evolution" Int. J. Hydrogen Energy 21(3):171-178 (1996).
Singh, N.K. et al. "Electrocatalytic properties of spinel type NiXFe3—XO4 synthesized at low temperature for oxygen evolution in KOH solutions" Indian Journal of Chemistry 38A:491-495 (1999).
Singh, J. P. et al., "New active spinel-type MXCO3—XO4 films for elecro-catalysis of oxygen evolution" Journal of New Materials for Electrocehmical systems 3:131-139 (2000).
Slavcheva, E. et al, "Sputtered iridium oxide films as electrocatalysts for water splitting via PEM electrolysis", Electrochimica Acta 52:3889-3894 (2007).
Stahl, S. S. et al. "Electrochemical water oxidation with heterogeneous cobalt oxide catalysts: Factors that influence the overpotential" (2010)—abstract only http://abstracts.acs.org/chem/239nm/program/view/php?obj_id=17402&terms= accessed Jan. 29, 2015, 1 page.
Suresh, M. S. et al. "Temperature dependence of hydrogen evolution reaction on nickel oxide electrode in sealed nickel/cadmium cells" Journal of Power Sources 45:27-253 (1993).
Trudel, S. et al. "Magnetic properties of nancrystalline iron oxide/amorphous manganese oxide nanocomposite thin films prepared via photochemical metal-organic deposition" J. Mater. Chem. 17:2206-2218 (2007).
Trudel, S. et al. "Top-down meets bottom-up—Electron-beam induced metalorganic deposition of amorphous iron ocide nanostructures" Can. J. Chem. 87:217-223 (2009).
Veggetti, E. et al., "Hydrogen evolution on oxide electrodes: Co3O4 in alkaline solution" J. Electroanal. Chem. 339:255-268 (1992).
Xu, J. et al., "The physical-chemical properties and electrocatalytic performance of iridium oxide in oxygen evolution" Electrochimica Acta 56:10223-10230 (2011).
Yagi, M. et al., "Remarkably high activity of electrodeposited IrO2 film for electrocatalytic water oxidation" Journal of Electroanalytical Chemistry 579:83-88 (2005).
International Search Report dated Jan. 4, 2013 issued in PCT/CA2012/050609.
Trudel, S. et al., "X-ray absorption fine structure study of amorphous metal oxide thin films prepared by photochemical metalorganic deposition", Journal of Solid State Chemistry, (2011), vol. 184, pp. 1025-1035.

\* cited by examiner

|       | A1          | A2          | C           | CA          |
|       | Dark  Light | Dark  Light | Dark  Light | Dark  Light |
|-------|-------------|-------------|-------------|-------------|
| 1.23V | 0.04  0.18  | 0.06  0.15  | 0.08  1.54  | 0.06  2.81  |
| 1.53V | 0.4   0.52  | 0.31  0.38  | 0.29  2.31  | 0.20  4.00  |
| 1.73V | 386.21 391.43 | 92.84 93.81 | 82.13 88.16 | 140.44 145.51 |

FIGURE 21

ELECTROCATALYTIC MATERIALS AND METHODS FOR MANUFACTURING SAME

FIELD OF THE INVENTION

The present invention relates to electrocatalytic materials and in particular to amorphous metal oxides and their use as catalysts for water oxidation.

BACKGROUND OF THE INVENTION

Clean renewable sources of energy are required to overcome the rising energy demand of the coming decades. Solar energy can be considered to be a carbon-neutral energy source of sufficient scale to meet future global energy demand. Variability in local insolation, however, requires cost-effective storage of solar energy for its large scale deployment as a primary energy source. In nature, photosynthesis captures sunlight and converts it into a wireless current which is stored. Efforts have been made to duplicate natural photosynthesis in energy conversion systems that capture and convert solar energy.

One of the most promising schemes for the large-scale storage of solar energy is the electrochemical conversion of water—an abundant and noncarbonaceous resource—into dihydrogen and dioxygen fuels. Electrolysis of water, that is, splitting water into oxygen and hydrogen gases, is one such energy conversion process that is not only important for the production of oxygen and/or hydrogen gases, but for energy storage. Energy is consumed in splitting water into hydrogen and oxygen gases and, when hydrogen and oxygen gases are recombined to form water, energy is released.

Electrocatalysts provide low energy activation pathways that permit electricity-producing reactions to occur at a practical rate. In the context of the electrolysis of water, electrocatalysts are required to negotiate the proton-coupled electron-transfer steps and thermodynamic demands associated with the oxidation of water (Equations 1 and 2).

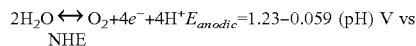
$2H_2O \leftrightarrow O_2 + 4e^- + 4H^+$ $E_{anodic} = 1.23 - 0.059$ (pH) V vs NHE

$4e^- + 4H^+ \leftrightarrow 2H_2$ $E_{cathodic} = 0.00 - 0.059$ (pH) V vs NHE Crystalline materials have been believed to be effective electrocatalysts as these materials provide the regularity of a crystal lattice that gives rise to a higher conductivity and less charge recombination at defects. U.S. patent application Ser. No. 10/343,272 describes a process involving spray pyrolysis (the use of toxic chemicals and high temperatures) in the preparation of a photocatalytic polycrystalline film of iron oxide.

Amorphous alloys have also been shown to be potentially effective electrocatalytic materials as these materials have shown higher activities and selectivities than their crystalline counterparts for many catalytic transformations. Reasons for the effectiveness of amorphous alloys have been attributed to a greater number of randomly oriented bonds in an amorphous solid relative to a crystalline solid enabling a higher density of coordinated unsaturated sites for the facile adsorption of reactants. As well, the discontinuous nature of amorphous materials can increase the number of edges and terminal oxygens (and thus an enhanced coverage of reactive species) as well as structural flexibility to enhance dioxygen evolution.

U.S. patent application Ser. No. 12/486,694 describes the electrolysis of $Co^{2+}$ in phosphate, methylphosphonate and borate electrolytes to prepare an amorphous highly-active water oxidation catalyst as a thin-film on a current collector.

Despite advances in the development of electrocatalysts, significant market penetration by commercial electrolyzers remains hindered by the absence of a commercially competitive catalytic material that exhibits low overpotentials and high current densities over prolonged time periods. Therefore, a need remains for the development of improved materials and devices that operate with increased energy conversion efficiency.

Further, while dopants, nanostructuring, co-catalysts, atomic layer deposition, and/or plasmonic materials are known to enhance the photocatalytic activity of hematite (an α-ferrous oxide), these methods are cumbersome, expensive and/or lead to variable and undesirable characteristics in the electrocatalyst. Alternate means to optimize the electronic properties of electrocatalysts are desirable.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an electrocatalytic material and a method for making an electrocatalytic material. In accordance with an aspect of the present invention, there is provided an electrocatalytic material comprising amorphous metal or mixed metal oxides. In accordance with another aspect of the present invention, there is provided a method of forming an electrocatalyst, comprising an amorphous metal oxide film comprising the steps of: providing a substrate; coating the substrate with a metallo-organic precursor solution; converting the metallo-organic precursor to zero oxidation state metal; and oxidizing the zero oxidation state material to a metal oxide to form the amorphous metal oxide film, wherein the metallo-organic precursor solution comprises a precursor selected from the group consisting of an iron precursor, a cobalt precursor, a nickel precursor, and mixtures thereof.

In accordance with another aspect of the present invention, there is provided a method of forming an electrocatalyst comprising an amorphous metal oxide film comprising the steps of: providing a substrate; coating the substrate with a metallo-organic precursor solution; converting the metallo-organic precursor to a prepared state metal; and oxidizing the prepared state material to a metal oxide to form the amorphous metal oxide film.

In accordance with another aspect of the present invention, there is provided a use of a metal oxide film in electrocatalysis. In accordance with another aspect of the present invention, there is provided a system for electrocatalysis comprising an electrocatalytic material comprising an amorphous metal oxide film.

BRIEF DESCRIPTION OF THE DRAWINGS

These and other features of the invention will become more apparent in the following detailed description in which reference is made to the appended drawings.

FIG. 21 is a table of current density values ($\mu$A/cm$^2$) from chronoamperometry studies of (A1) a film of 5 layers of amorphous iron oxide annealed at 250° C.; (A2) a film of 5 layers of amorphous iron oxide annealed at 400° C.; (C) a film of 5 layers of crystalline iron oxide annealed at 600° C.; and (CA) a film of 4 layers of crystalline iron oxide annealed at 600° C. and one layer of amorphous iron oxide annealed at 250° C.; at difference voltages, in light (1 sun equivalent) and dark conditions, according to one embodiment of the present invention.

DETAILED DESCRIPTION OF THE INVENTION

Figure 1:
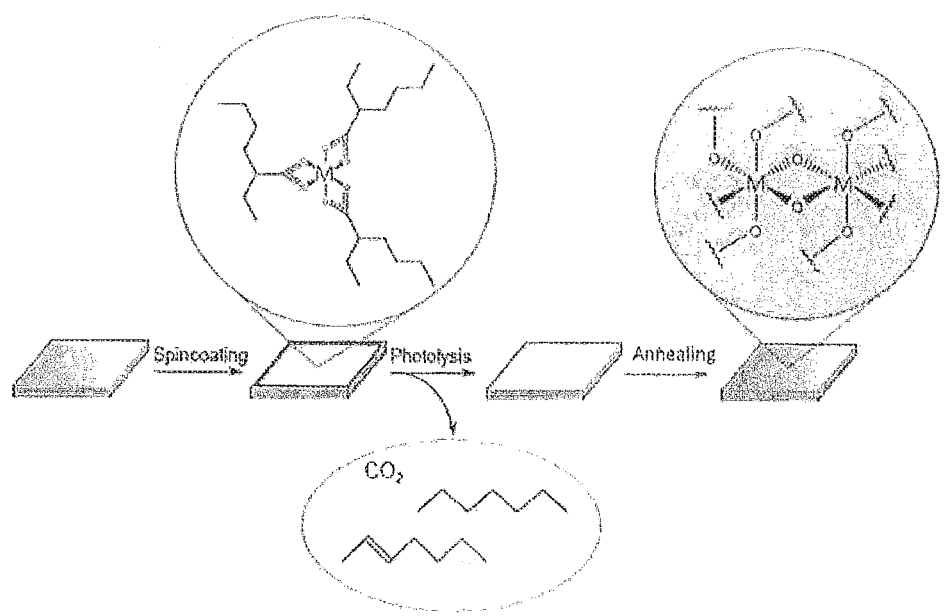
FIG. 1 presents a schematic of the method for preparing an electrocatalyst, according to an embodiment of the present invention.

The present invention relates to electrocatalytic materials, a method for preparing electrocatalytic materials, and the use of electrocatalytic materials of the present invention in electrodes, systems, and methods for electrolysis of water and other electrochemical techniques.

The electrocatalytic materials of the present invention comprise metal oxides. In one embodiment, the metal oxides of the electrocatalytic materials comprise amorphous metal oxides. In accordance with the present invention, the metal oxide may comprise the oxide of a single metal selected from, but not limited to iron, cobalt, nickel, ruthenium, platinum, palladium, molybdenum, osmium, manganese, chromium, titanium, rhodium and iridium oxides. In embodiments of the present invention, the metal oxide comprises iron oxide, cobalt oxide, nickel oxide or iridium oxide. The present invention also relates to catalysts comprising mixed metal oxides, including combinations of two, three or more metal oxides in varying proportions. Examples of binary systems that fall within the scope of the present invention include, but are not limited to, iron/cobalt, iron/nickel, cobalt/nickel, cobalt/aluminum, nickel/aluminum, iron/aluminum, iron/cerium, iron/molybdenum, iron/copper, iron/iridium, iron/manganese, iron/tin, and iron/niobium. Examples of ternary systems that fall within the scope of the present invention include, but are not limited to, iron/cobalt/nickel, iron/aluminum/nickel, aluminum/cobalt/nickel, and aluminum/cobalt/iron mixtures. In accordance with one embodiment of the present invention, the catalyst comprises a doped metal oxide, including but not limited to iridium doped iron oxide, molybdenum doped iron oxide, and niobium doped iron oxide.

The electrocatalytic materials of the present invention are prepared by a method involving photochemical metal organic deposition (PMOD) technique. PMOD is a benchtop process that requires neither high vacuum or elevated temperatures; uses simple and benign precursors; and is compatible with a variety of nanostructuring schemes (including imprint lithography, electron-beam patterning, and nanocomposite synthesis). Accordingly, PMOD is a low-cost and scalable technique which is amenable to large-scale production and nanostructuring, for obtaining large-area electrodes. PMOD is also amenable to the deposition of mixed metal oxide films, obtained when two or more precursors are premixed in a precursor solution.

A person skilled in the art will appreciate it is within the scope of the present invention that the electrocatalytic materials, including amorphous metal oxides, may be prepared by other means including by making amorphous metal oxide films by dipping electrodes into a precursor solution and applying an external bias to convert the precursor solution to an amorphous metal oxide. These amorphous metal oxide films may subsequently be tuned by any suitable method, including by annealing as described herein.

In one embodiment, therefore, the present invention provides a method for preparing electrocatalytic materials, comprising coating a substrate with a precursor solution. A precursor solution may include a single metallo-organic precursor or, where a mixed metal oxide film is desired, a mixture of different precursors. Where a mixture of metallo-organic precursors is used, the amount of each precursor in the precursor solution is determined to provide the desired final metal oxide ratios in the resulting catalytic film.

The coating of a substrate with the precursor solution may be achieved by means including, but not limited to, spin coating, dip coating, spray coating, and wiping. After the substrate has been coated with the precursor solution, the coated substrate undergoes a sequence of steps by which the precursor is converted to a metal oxide suitable for electrocatalysis. In this embodiment, the metallo-organic precursor is converted to a zero oxidation state metal. In another embodiment, the precursor solution to the electrocatalyst material does not achieve a zero oxidation state, but the metallo-organic precursor is instead converted to a prepared precursor state metal. The conversion may be achieved by means including, but not limited to, photolysis using visible or UV incident light, irradiation with an electron beam, irradiation with ions, or calcination.

Most metal oxide deposition methods known in the art, such as electro-deposition, liquid phase deposition, sol-gel, chemical vapour deposition, atomic layer deposition, sputtering, pulsed laser deposition, and molecular beam epitaxy, utilize high temperatures or electrical bias and result in thermodynamically stable crystalline forms. The method of the present invention, however, yields stable amorphous thin films distinct from polycrystalline and crystalline films. The amorphous electrocatalytic materials resulting from the present process are not necessarily static and can have a tunable photoresponse and catalytic activity that may be modified in a fashion that is unaccessible to crystalline solids. As a result, the present process provides greater ability to control and manipulate the characteristics of the resulting film. Accordingly, in another embodiment, the present invention provides a method for optimizing or tuning the electronic properties of electrocatalysts of the present invention. The selection or tuning of the properties of the electrocatalytic material may be achieved by means including, but not limited to, annealing at selected temperature, annealing under oxidizing or reducing atmospheres at selected temperatures, or irradiation with an ion beam. In one embodiment, an annealing step is carried out to improve the catalytic properties of the final electrocatalytic material.

As is also demonstrated herein, the catalytic activity of the electrocatalytic materials prepared in accordance with the present invention can be modulated by controlling the combination and relative proportions of the components of the metal oxide mixtures.

Electrocatalytic materials provided by the invention are made of readily-available and/or low-cost material, and are easy to make in mild conditions. Accordingly, the invention lends itself to being mass-producible and commercially competitive in the field of energy capture, storage, and use, as well as oxygen and/or hydrogen production, and/or production of other oxygen and/or hydrogen-containing products.

The system of the present invention provides a means to catalyse (including photocatalysing) the electrolysis ("splitting") of water by the electrocatalytic material.

The method of the present invention provides a class of electrocatalytic materials that facilitate the production of oxygen and/or hydrogen gas from water at low overpotential. Electrolysis of water, facilitated by the invention, is useful in a wide variety of areas, including in the storage of energy. The invention allows for the facile, low-energy conversion of water to hydrogen gas and/or oxygen gas, where this process can be easily driven by a standard solar panel (e.g., a photovoltaic cell), wind-driven generator, or any other power source that provides an electrical output. The solar panel or other power source can be used to directly provide energy to a user, and/or energy can be stored, via a reaction catalyzed by materials of the invention, in the form of oxygen gas and/or hydrogen gas. In some cases, the hydrogen and oxygen gases may be recombined at any time, for example, using a fuel cell, whereby they form water and release significant energy that can be captured in the form of mechanical energy, electricity, or the like. In other cases, the hydrogen and/or oxygen gases may be used together, or separately, in another process.

Referring to FIG. 1, which depicts a schematic of one embodiment of the method of the present invention, the method involves spincoating a metallorganic precursor solution onto a substrate. The precursor is subsequently photolysed under UV light irradiation. During this process organic ligands are lost as volatile by-products and zero oxidation-state metal or prepared precursor state metal remains on the substrate (Equation 3).

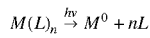

The metal is then readily oxidized in metal oxide by atmospheric oxygen. The resulting film is composed of amorphous metal oxide (Equation 4).

An example of a suitable substrate is fluorine doped tin oxide (FTO) glass, which has a low price and suitable conductive properties. Other suitable substrates include, but are not limited to, indium tin oxide, transparent conducting oxides, semiconducting substrates (e.g. Si, Ge. ZnO), metal surfaces, and conducting plastic.

Precursor Organic Ligand. The precursor organic ligand of the method of the present invention is photosensitive, in that it may be degraded under UV light. In one embodiment, the organic ligand is chiral, so the precursor film is composed of diastereomeric molecules which do not crystallize. As a result, after photolysis occurs, the deposited material is amorphous. In one embodiment, the precursor is soluble in an organic solvent such as but not limited to hexanes, methyl iso-butyl ketone, acetone, n-butylacetate, toluene, anisole, which has the advantage of being easier to remove than water. In one embodiment, the ligand is an alkanoate, e.g. 2-ethylhexanoate, which is commercially available, relatively inexpensive, possesses an absorption coefficient of approximately 250 nm, and has an unresolved chiral center. It is understood that, under suitable conditions, 2-ethylhexanoate decomposes into volatile byproducts (carbon dioxide, heptane and 2-heptene) according to the following mechanism:

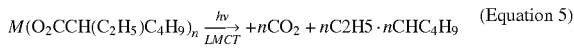  (Equation 5)

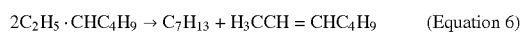  (Equation 6)

The volatile byproducts are subsequently easily removed from the reaction, leaving a film of metal oxide deposited on the plate which need not be cleaned or purified.

In a further embodiment, the electronic properties of amorphous materials are not necessarily static and can be modified ("tuned") in a manner that is unaccessible to crystalline solids. PMOD yields stable thin films with photoresponse and catalytic activities that can be tuned by varying the annealing temperature. A person skilled in the art will appreciate other tuning methods are within the scope of the present invention An annealing step (depicted as "Δ" in FIG. 2) is used to tune the electrochemical properties of the films.

In a further embodiment, the invention provides not only electrocatalytic materials and compositions, but also related electrodes, devices, systems, kits, processes, etc. Non-limiting examples of electrochemical devices suitable for use with the materials provided in accordance with the present invention, including without limitation, electrolytic devices and fuel cells. Energy can be supplied to electrolytic devices by photovoltaic cells, wind power generators, or other energy sources.

The structure of the films was investigated using a variety of techniques. Most films created were amorphous made their analysis less straightforward than if they were crystalline.

Although the compositions, electrodes, systems, and methods described herein are primarily related to water electrolysis (i.e., forming oxygen gas, hydrogen gas, and/or other products from water) and/or the oxidation of hydrogen (e.g., hydrogen gas), the invention is not limited in this way. Where the invention is described as involving a first electrode and/or a second electrode (one or both of which can include an electrocatalytic material), with production of oxygen gas via water electrolysis at the first electrode and/or production of hydrogen gas at the second electrode, it is to be understood that the first electrode can facilitate oxidation of any species, water or otherwise, to produce oxygen gas or another oxidized product. Examples of reactants that can be oxidized in this context can include methanol, formic acid, ammonia, etc. Examples of oxidized products can include $CO_2$, $N_2$, etc. At the second electrode, a reaction can be facilitated in which water (or hydrogen ions) is reduced to make hydrogen gas, but it is to be understood that a variety of reactants not limited to water (e.g., acetic acid, phosphoric acid, etc.) can be reduced to form hydrogen gas and any number of other products of the reduction reaction (e.g., acetate, phosphate, etc.). This reaction at the second electrode can be run in reverse, in "fuel cell" operation, such that hydrogen gas (and/or other exemplary products noted above) is oxidized to form water (and/or other exemplary reactants noted above). In some cases, the compositions, electrodes, methods, and/or systems may be used for reducing hydrogen gas. In some cases, the compositions, electrodes, methods, and/or systems may be used in connection with a photoelectrochemical cell. It should be understood that while much of the application herein focuses on the formation of hydrogen and/or oxygen gas from water, this is by no means limiting, and the compositions, electrodes, methods, and/or systems described herein may be used for other purposes, as described herein. Non-limiting examples of electrochemical devices provided by the invention include electrolytic devices and fuel cells. Energy can be supplied to electrolytic devices by photovoltaic cells, wind power generators, or other energy sources. These and other devices are described herein.

Definitions

Unless defined otherwise, all technical and scientific terms used herein have the same meaning as commonly understood by one of ordinary skill in the art to which this invention belongs.

The term "amorphous" as used herein, refers to a material with a disordered atomic-scale structure and no long-range ordering.

The term "electrocatalyst" as used herein, refers to a material that is involved in and increases the rate of a chemical electrolysis reaction (or other electrochemical reaction) and which, itself, undergoes reaction as part of the electrolysis, but is largely unconsumed by the reaction itself, and may participate in multiple chemical transformations. An electrocatalyst may also be referred to as an electrocatalyst composition. It is contemplated that the term electrocatalyst as used herein can include photocatalytic activity.

The term "electrode" as used herein, refers to a solid electric conductor through which an electric current enters or leaves an electrolytic cell or other medium.

The term "electrolysis" as used herein, refers to the use of an electric current to drive an otherwise non-spontaneous chemical reaction. For example, in some cases, electrolysis may involve a change in redox state of at least one species and/or formation and/or breaking of at least one chemical bond, by the application of an electric current. Electrolysis of water, as provided by the invention, can involve splitting water into oxygen gas and hydrogen gas, or oxygen gas and another hydrogen-containing species, or hydrogen gas and another oxygen-containing species, or a combination. In some embodiments, devices of the present invention are capable of catalyzing the reverse reaction. That is, a device may be used to produce energy from combining hydrogen and oxygen gases (or other fuels) to produce water.

The term "chalcogenide" as used herein, refers to a binary compound comprising a chalcogen and a more electropositive element or radical. A "chalcogen" as used herein, refers to the elements oxygen (O), sulfur (S), selenium (Se), tellurium (Te), the radioactive element polonium (Po) and the synthetic element ununhexium (Uuh). Where "chalcogen" and/or "chalcogenide" is used herein to describe what those of ordinary skill in the art would understand to exclude oxygen and oxides, it is to be understood that a chalcogen and/or chalcogenide as defined above is intended.

The use of water as a reactant for catalysis, as referenced herein, is to be understood to mean that the water may be provided in a liquid and/or gaseous state. The water used may be relatively pure, but need not be, and it is one advantage of the invention that relatively impure water can be used. The water provided can contain, for example, at least one impurity (e.g., halide ions such as chloride ions). In some cases, the device may be used for desalination of water. It should be understood that while much of the application herein focuses on the catalytic formation of oxygen gas and hydrogen gas and/or other products from water, this is not limiting, and the compositions, electrodes, methods, and/or systems described herein may be used for other catalytic purposes, as described herein. For example, the compositions, electrodes, methods and/or systems may be used for the catalytic formation of water from oxygen gas.

Electrocatalyst

The present invention relates to an electrocatalyst, a method for preparing the electrocatalyst of the present invention, a system for electrocatalysis, and use of the electrocatalyst in the hydrolysis of water.

The method for preparing the electrocatalyst comprises a thin film deposition technique known in the art of direct lithography in the design of transistors, the Photochemical Metal Organic Deposition (PMOD) technique.

When it is desirable to tune the electronic properties of the electrocatalyst, this may be done by annealing the electrocatalyst film in air at increased temperature.

Electrochemical Devices/Systems

The present invention relates to electrocatalytic materials suitable for use in systems and devices including but not limited to photoelectrochemical cells, (photo)electrocatalytic devices, dye-sensitized solar cells, photovoltaic devices, carbon capture systems, sensors, oil upgrading facilities, chemical production facilities, electrolyzers, desalination systems and devices, water purification systems and devices, and semiconductors.

Electrocatalyst and Related Electrodes

The present invention relates to electrocatalytic materials as electrodes and related electrodes comprising electrocatalytic materials including but not limited to conducting glass substrates, indium-doped tin oxide, and metal substrates (e.g., sheet metal).

To gain a better understanding of the invention described herein, the following examples are set forth. It will be understood that these examples are intended to describe illustrative embodiments of the invention and are not intended to limit the scope of the invention in any way.

EXAMPLES

Preparation of Single and Mixed Metal Oxide Films

Example 1

The following example describes the preparation of an amorphous iron oxide-based film.

Figure 2:
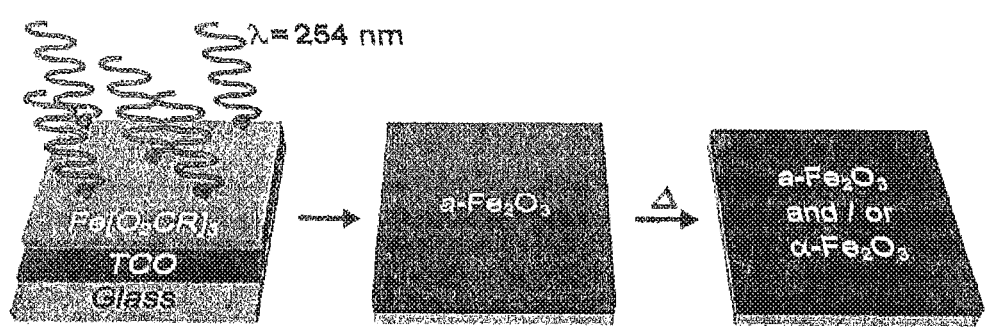
FIG. 2 presents a schematic of the method for preparing an electrocatalysts, according to an embodiment of the present invention using an iron (III)-2 alkanoate [Fe(O$_2$CR)$_3$], which is converted to ferric oxide during photolysis.

Referring to FIG. 2, substrate covered with a transparent conducting oxide (TCO) is used as a substrate for the film as well as an electrical contact (from the TCO). In this example, in-house cut (ca. 2×2 cm) fluorine-doped tin oxide (FTO; TEC 8; 8 $\Omega cm^{-2}$) substrates were successively scrubbed with Alconox™ detergent, sonicated in Alconox™ for 15 min, rinsed with deionized $H_2O$ and sonicated in deionized $H_2O$ and then ethanol for 5 min each, exposed to UV light and $O_{3(g)}$ for 15 min and spin-coated immediately. The precursor, iron (III) 2-ethylhexanoate, was synthesized by adding $FeCl_3 \cdot 6H_2O$ (1.100 g, 6.84 mmol) and 2-ethylhexanoic acid (3.009 g, 20.59 mmol) to 250 mL of methanol with a stoichiometric amount of KOH (1.285 g, 22.90 mmol). Potassium chloride quickly precipitated out and the solution was isolated through filtration and reduced in volume to give a reddish oil. The oil was then re-dissolved in hexanes and extracted 3 times with distilled water. The hexanes were then dried with magnesium sulfate and the volume of the red solution was reduced in vacuo to give a viscous red-brown oil (2.696 g, 81.2% yield). The molecular composition of the resulting iron (III) 2-ethylhexanoate was determined by mass analysis to be C 58.35, H 9.29, N 0.87, compared to a calculated composition of C 59.4, H 9.3, N 0. Investigation of the ethylhexanoic acid (99.7%, Sigma Aldrich) found a molecular composition of C 66.34, H 11.08, N 0.88, compare to a calculated composition of C 66.63, H 11.18, N 0, thus explaining the presence of nitrogen in the $MO_x$ precursor.

Iron(III) 2-ethylhexanoate was dissolved in hexanes (15% w/w). This solution was sonicated 2 min, filtered with a syringe through a 0.2 μm nylon membrane (Life Sciences Acrodisc™), and immediately used. The surface of the clean substrate was saturated with precursor solution and spin-coated (7 sec spread at 1000 rpm, 60 sec spin at 3000 rpm) to yield a thin film of iron(III)-2-ethylhexanoate of optical quality. The coated substrates were subjected to a pre-exposure bake (60° C., 5 min) to remove residual solvent. The coated substrates were exposed to deep-UV light (UVP UVG-54 6 mW low-pressure mercury lamp, λ=254 nm) for 12 hr, under otherwise ambient conditions to induce a photochemically-triggered ligand-to-metal charge-transfer that leads to the destabilization and subsequent decomposition of the complex to yield a $Fe_2O_3$ film. During this time the film color changed from opaque red/brown to opaque yellow.

A person skilled in the art will appreciate the scope of the present invention includes other organo-metallic solutions are suitable for use as precursor solutions, by way of example, other iron(III)-2-ethylhexanoate solutions including but not limited to commercially available 52% (w/w) iron(III)-2-ethylhexanoate in mineral spirits, which may be diluted before use.

Example 2

In another example, the film of Example 1 is annealed at a temperature chosen from the range of room temperature (i.e. the non-annealed, as-prepared film) to 600° C. for the purpose of selecting properties in the film. The whole PMOD process including annealing is illustrated in FIG. 2.

Example 3a

The films of example 1 were then annealed at different temperatures ranging from no annealing (i.e. not heat-annealed) to 600° C. The films got darker as the annealing temperature increased, indicating a change in structure at a molecular level. Above an annealing temperature of 600° C., the glass substrate started to melt, destroying the samples. The resultant data regarding film characteristics are presented in FIG. 5.

As-prepared films of α-$Fe_2O_3$ were then annealed in air for 1 h at temperatures ranging between 100° C. and 600° C.

Figure 3:
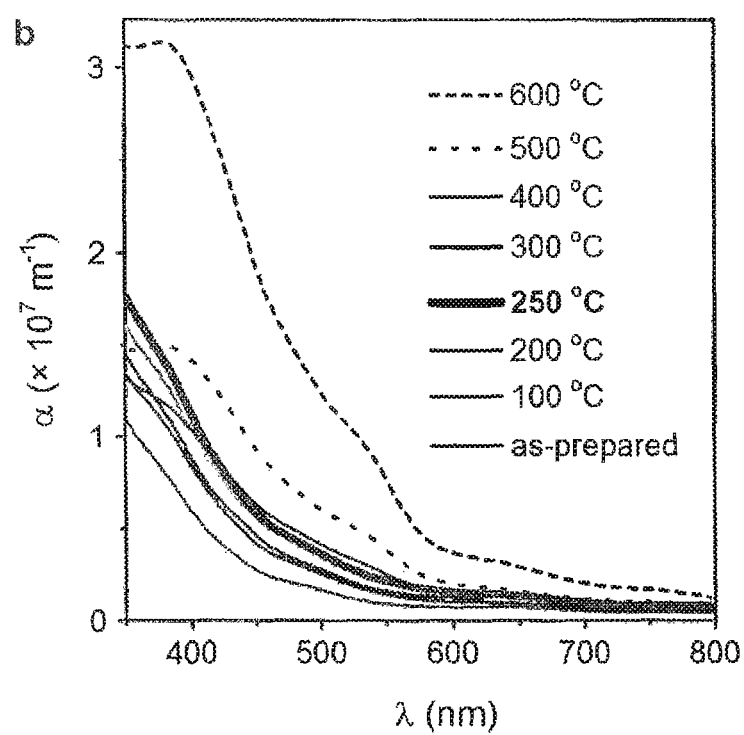
FIG. 3 illustrates the optical characteristics of Fe$_2$O$_3$ films.
Figure 5:
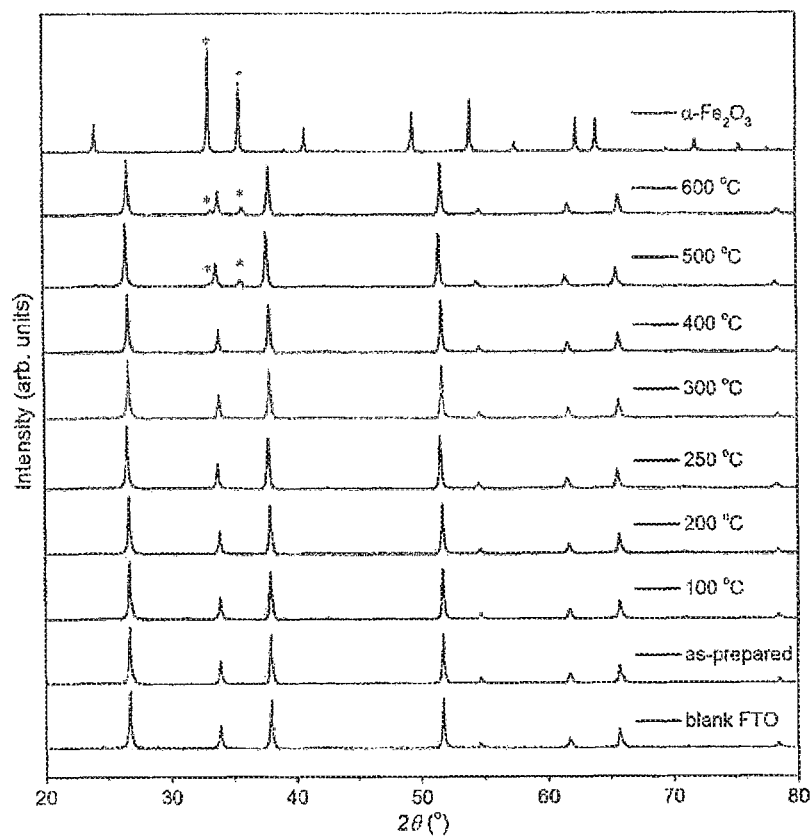
FIG. 5 illustrates the x-ray diffraction patterns for prepared Fe$_2$O$_3$ films which were annealed at various temperatures according to one embodiment of the present invention.
Figure 6:
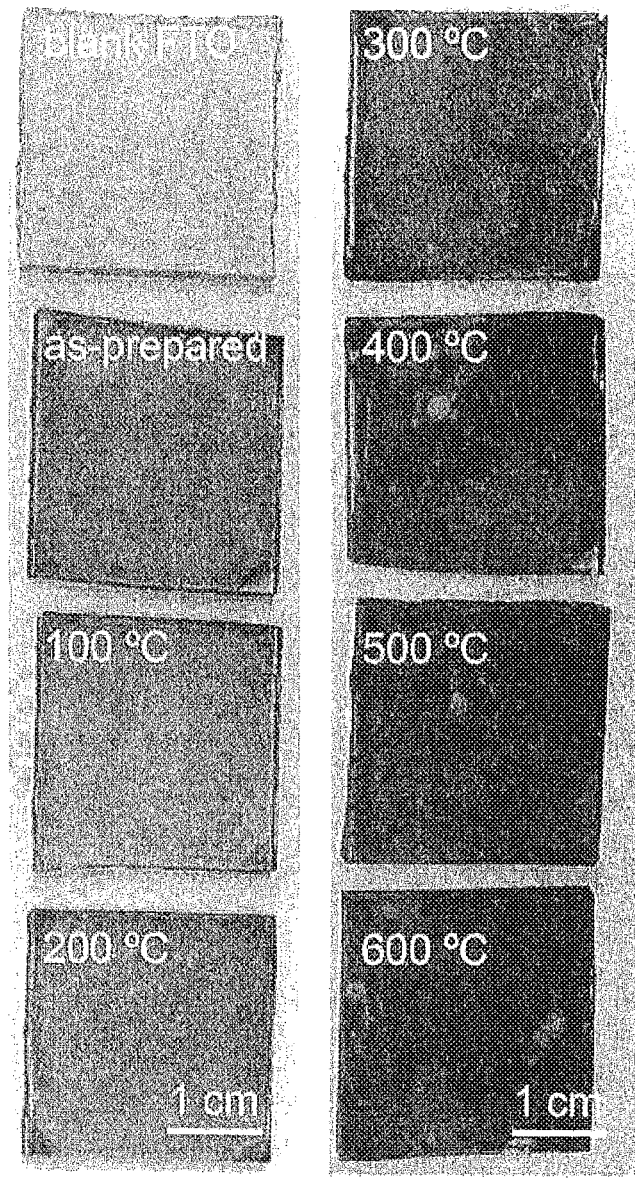
FIG. 6 is a series of photographs of Fe$_2$O$_3$ films which were annealed at various temperatures according to one embodiment of the present invention.
Figure 7:
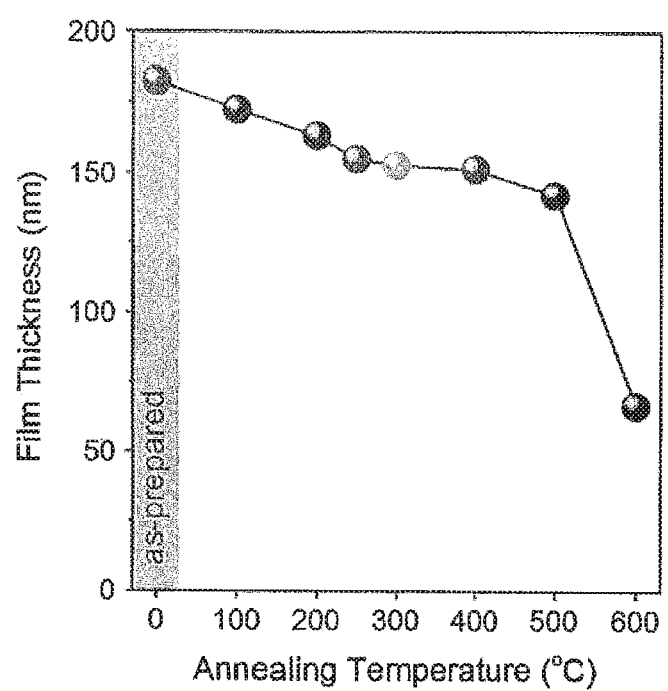
FIG. 7 illustrates the thickness of Fe$_2$O$_3$ films as a function of annealing temperature according to one embodiment of the present invention.
Figure 22:
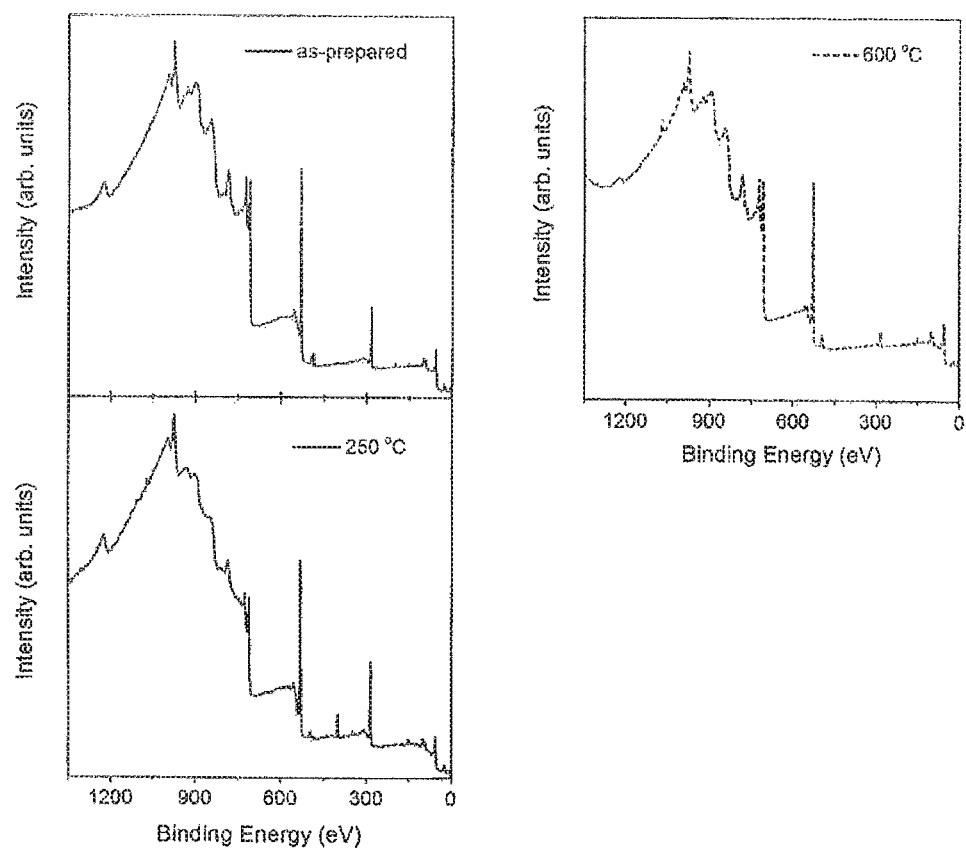
FIG. 22 is a series of wide scan survey spectra from XPS studies of as-prepared Fe$_2$O$_3$ film, and Fe$_2$O$_3$ films annealed at 250° C. and 600° C.

FIG. 5 shows the amorphous material is remarkably robust towards crystallization: Bragg peaks due to $\alpha$-Fe$_2$O$_3$ are not observed in the x-ray diffraction patterns until $T_{anneal} \geq 500°$ C. Even though all of the films annealed at temperatures up to 400° C. are deemed amorphous, the electronic properties of the films are not constant as evidenced by the changing color of the films (FIG. 6) and the disparate absorption coefficients, which are related to the onset of light absorption is pushed further towards lower energies at progressively higher annealing temperatures as shown in FIG. 3). Because X-ray photoelectron spectra confirm that the annealed $\alpha$-Fe$_2$O$_3$ films contain ferric sites exclusively, which is resonant with as-prepared $\alpha$-Fe$_2$O$_3$ and hematite films, as shown in FIG. 22, we ascribe the divergent electronic properties to polyamorphism; i.e., various instances of a structurally disordered material with same composition but different resulting properties. The modification of the material brought on by annealing includes a densification of the material (FIG. 7). At sufficiently high annealing temperatures, the densification process renders a long-range ordered hematite film. The absorption coefficients determined for samples $T_{anneal} \geq 500°$ C. show signature features of hematite (FIG. 3b), which is also consistent with the XRD results (FIG. 3a). Further characterization of the resultant films is discussed below.

Example 3b

In another example, iron and cobalt oxide films were created and the precursor solutions used were respectively 15% and 8% (w/w) in hexane. Both precursors absorbed light at 254 nm. The precursor decomposition was followed using IR spectroscopy, and spectra collected over time are presented in FIG. 4. Photolysis was considered complete when the IR spectrum of the sample looked the same as the spectra of the blank (control) substrate. Both precursors were fully photolysed overnight, i.e. after 16 h of irradiation.

Example 4

In this example, samples of three compositions are prepared from single/binary/ternary solutions of metal 2-ethylhexanoate PMOD precursors. Table 1 lists the specific compositions of the metals precursor solutions. The weight percentage of individual metal precursor is chosen to reflect its solubility in hexane and the optimization in catalytic effects of the resulting MO$_x$ film.

TABLE 1

| Sample | Precursor content (% w/w) Fe(L)$_3$:Co(L)$_2$:Ni(L)$_2$ |
|---|---|
| Fe | 15:0:0 |
| FeCo | 15:8:0 |
| FeCoNi | 15:8:8 |

FTO substrates were first cut to 2.5×2.5 cm and then sonicated in an Alconox® detergent solution for 15 min, followed by rinsing with deionized H$_2$O and sonication in deionized H$_2$O (5 min) and then ethanol (5 min). The substrates were then exposed to the PSD UV3 Ozone Cleaner (Novascan) for 15 min and spin-coated immediately. Metal-organic precursor solutions were prepared by dissolving the calculated amount of different precursors in hexanes to the weight percentage listed in Table 1. The precursor solutions were then spin-coated (7 sec spread at 1000 rpm, 60 sec spin at 3000 rpm) onto the cleaned FTO substrates. The coated substrates were exposed to deep-UV light (UVP UVG-54 6 mW low-pressure mercury lamp) 24 hr to allow a complete conversion of the precursor to the metal oxides. All samples are transparent and homogeneous in appearance.

Characterization of Amorphous Single Metal Oxide Films
X-Ray Diffraction and X-Ray Absorption Fine Structure Example 5

The amorphous nature of the as-prepared $\alpha$-FeO$_3$ films as prepared, and after annealing at various temperatures were investigated using X-ray diffraction (XRD) studies, using a Rigaku Multiflex $\theta$-2$\theta$ diffractometer (scan speed=0.016° min$^{-1}$, Cu K$_\alpha$ tube, $\lambda$=1.5406 Å) and baseline-corrected with Jade 6.5 software.

FIG. 5 illustrates the XRD results of Fe$_2$O$_3$ films annealed at various temperatures, and confirms the amorphous nature of the films as prepared, and after annealing at up to 400° C. Blank FTO and hematite are provided as reference scans. The onset of the hematite phase for films at $T_{anneal} \geq 500°$ C. is indicated by the observations of Bragg reflections at 2$\theta$=33.2° and 35.6° which correspond to the ($\bar{1}$14) and ($\bar{1}$20) peaks for hematite. The formation of $\alpha$-Fe$_2$O$_3$ is achieved because the photochemical nature of the precursor decomposition bypasses the high temperatures necessary to the formation of crystalline solids thus enabling the kinetic trapping of the metastable amorphous photoproduct. X-ray absorption fine structure (XAFS) studies of as-prepared $\alpha$-Fe$_2$O$_3$ thin films generated by PMOD have confirmed the metal ions to be trivalent, and indicate no long-range order beyond the second nearest neighbor shell.

FTIR Analysis

Example 6

Figure 4:
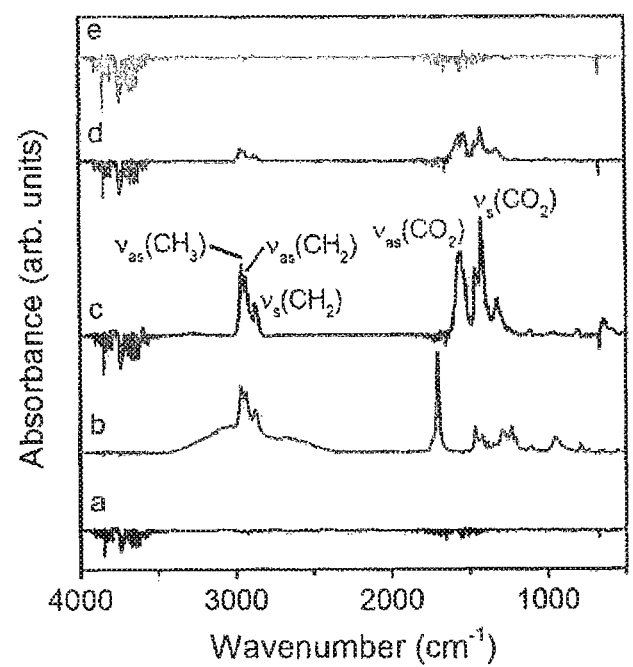
FIG. 4 illustrates the infrared spectra at various time points during the photolysis of the Fe(III) 2-ethylhexanoate precursor on CsI plates according to one embodiment of the present invention.

Fourier transform infrared spectroscopy (FTIR) was carried out using a Nicolet NEXUS 470 FTIR E.S.P. spectrometer to monitor the photochemical reaction of the precursor film. CsI and KBr IR plates were spin coated with hexanoic solutions varying in amount of precursor (% w/w), and the decomposition of the precursor was monitored by FTIR. FIG. 4 shows the effect of photolysis on the Fe(III) 2-ethylhexanoate precursor on CsI plates by infrared spectroscopy. Spectra (a) represents Blank CsI substrate; (b) Spin-coated film of 2-ethylhexanoic acid on CsI; and (c) Spin-coated solution of 15 w.t. % Fe(III) 2-ethylhexanoate prior to photolysis. The corresponding films were re-analysed after additional photolysis for (d) 2.5 h and (e) 6.3 h at ($\lambda$=254 nm). Progressive decrease in absorbance of the C—H and C—O/C=O vibrational modes. $\nu_{as}$ and $\nu_s$ are asymmetric and symmetric stretches, respectively. The signal centred at 1323 cm$^{-1}$ (not labelled) is a hydrocarbon chain vibrational mode corresponding to 2-ethylhexanoate.

Visual/Optical Characteristics

Example 7

Visual characterization of films was carried out on a variety of films. FIG. 6 shows photographs of Fe$_2$O$_3$ films annealed at various temperatures. Blank FTO is provided as a reference. The red color of the films becomes more intense at progressively higher annealing temperatures.

UV-visible spectroscopy was performed on both iron and cobalt oxide films. UV/Vis absorbance spectra were collected with a Cary 5000 spectrophotometer (Varian). All spectra were referenced to a blank FTO substrate.

Figure 15:
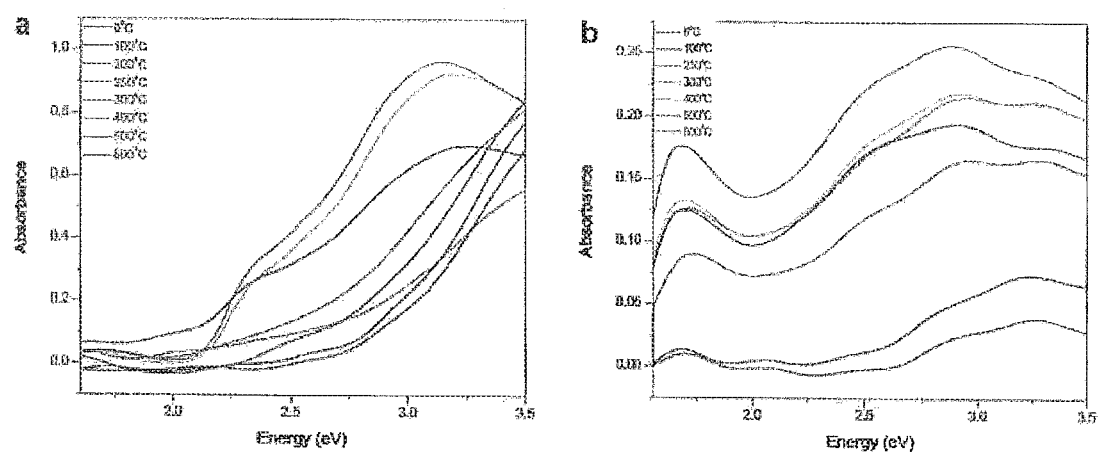
FIG. 15 is UV and visible spectra of (a) iron oxide films, and (b) cobalt oxide films, annealed at various temperatures, according to one embodiment of the present invention.

Spectra for iron oxide films are presented in FIG. 15 (a) and spectra for cobalt oxide films are presented in FIG. 15(b). For iron oxide films, the shape of the spectrum changed drastically above 400° C., which was consistent with the structural changes associated with hematite formation. Additionally, the shoulders at 2.3 eV and 3.2 eV are once again characteristic of the formation of a hematite phase. Iron oxide film samples showed a good absorption signal in the visible range, especially the ones annealed at higher temperatures, conforming that this material had the potential to be photocatalytic. On the contrary, cobalt oxide film samples showed a very weak absorbance in the visible light range, precluding their use as photocatalysts. However, a rise in absorption around 1.7 eV were noted for samples annealed above 250° C. These changes, even if much slighter than in the case of the iron oxide films, were attributed to the formation of a crystalline $Co_3O_4$ phase based the corresponding UV-visible spectra for this material.

FIG. 3b shows the absorbance spectra for iron oxide films as a function of incident wavelength of light. It was also determined that the closest parent crystalline iron oxide is hematite. An examination of the absorption coefficient of the as-prepared $\alpha$-$Fe_2O_3$ film shows that significant light absorption is observed only below 500 nm (i.e., >~2.75 eV).

Figure 16:
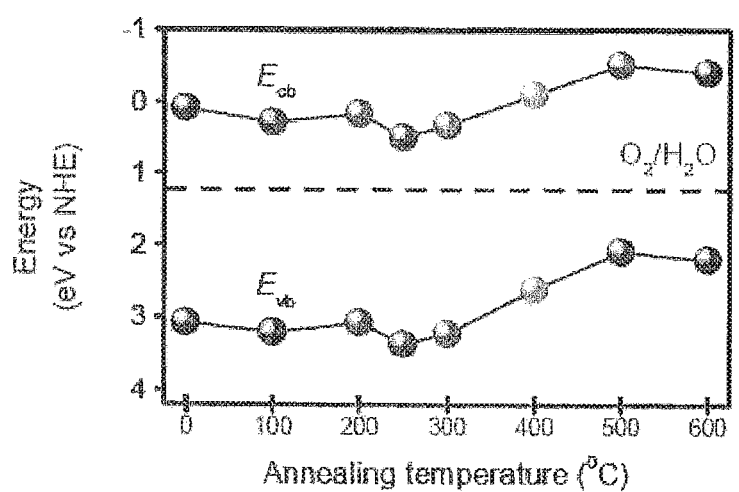
FIG. 16 is the valence band E$_{vb}$ and conduction band E$_{cb}$ positions plot derived from ultraviolet photoelectron spectroscopic and UV-vis data for iron oxide films annealed at various temperatures, according to one embodiment of the present invention.
Figure 17:
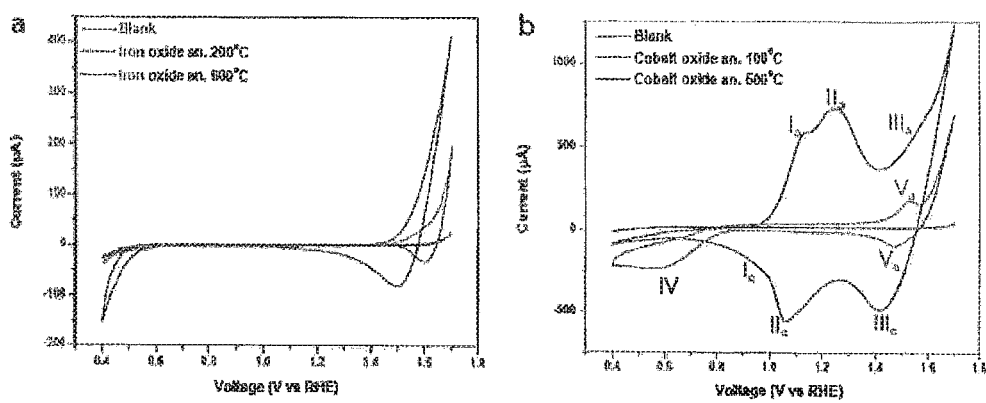
FIG. 17 is the cyclic voltammograms studies on (a) iron oxide films, and (b) cobalt oxide films, annealed at various temperatures, according to one embodiment of the present invention.

Ultraviolet Photoelectron Spectroscopy (UPS) was used to investigate the position of the valence band of iron oxide materials annealed at different temperatures. UPS ionizes the material surface by removing electrons from the valence band of the sample and monitoring their energy. The valence band positions determined with this technique are shown in FIG. 16, with the corresponding conduction band positions deducted from the Tauc analysis.

A wider difference in energy between the electrolyte and the valence band of the material thermodynamically favours electron transfers from the electrolyte to the material of the metal oxide films. For this reason, amorphous materials showed a better valence band positioning than the crystalline film, which was annealed at 600° C. More precisely, the sample annealed at 250° C. seemed to have the best band positioning for electrocatalysis.

Film Thickness

Example 8

Optical Profilometry was used to determine the thickness of the films annealed at various temperatures. The results are shown in FIG. 7. The data demonstrate that higher annealing temperatures yielded thinner films, up to a 600° C. annealing temperature. This was due to an increasing densification of the material with temperature. The sharp drop in thickness between the samples annealed at 500° C. and 600° C. differed from the slow decrease observed at lower temperatures. This was attributed to changes in the structure of the material when annealed at 600° C. The measurements show that the films were ultrathin, with thicknesses in the order of nanometers. Black data points ($T_{anneal} \geq 500°$ C.) indicate presence of hematite phase. These data indicate a densification of the amorphous material as it is annealed, which is interpreted as a filling of long-range coordination numbers with nearest-neighbor atomic shells. These values are among the lowest reported in the creation of oxide films. This is due to previously discussed limitations of the photolysis process.

Optical Determination of Band Gaps ($E_g$)

Example 9

The Tauc model was developed to parametrize the optical functions of amorphous materials in their interband region. This empirical model takes into account the states present in this region to describe the absorption behaviour of amorphous chalcogenide materials. These additional states create an absorption tail inside the interband region, giving rise to an absorption coefficient behaving differently than in crystalline materials. Tauc, and later Mott and Davis showed that absorption coefficients in amorphous materials followed the relationship:

$$\alpha h\nu = K \times (h\nu - E_g^{opt})^n \qquad \text{(Equation 7)}$$

where $\alpha$ is the absorption coefficient of the material, h is the Planck constant, $\nu$ is the frequancy of the incident radiation, K is characteristic constant, $E_g^{opt}$ is the optical bandgap of the material, and n=½ for indirect transitions, and n=2 for direct transitions.

An absorption coefficient can be derived from absorbance and thickness:

$$A = \log\left(\frac{I_0}{I}\right) \qquad \text{(Equation 8)}$$
$$I = I_0 \times e^{-\alpha z}$$

where A is the absorbance, $I_0$ is the intensity of the incident light, and I is the intensity of the transmitted light. Therefore it follows that:

$$\alpha = \frac{A}{z} \times \ln 10 \qquad \text{(Equation 9)}$$

Figure 8:
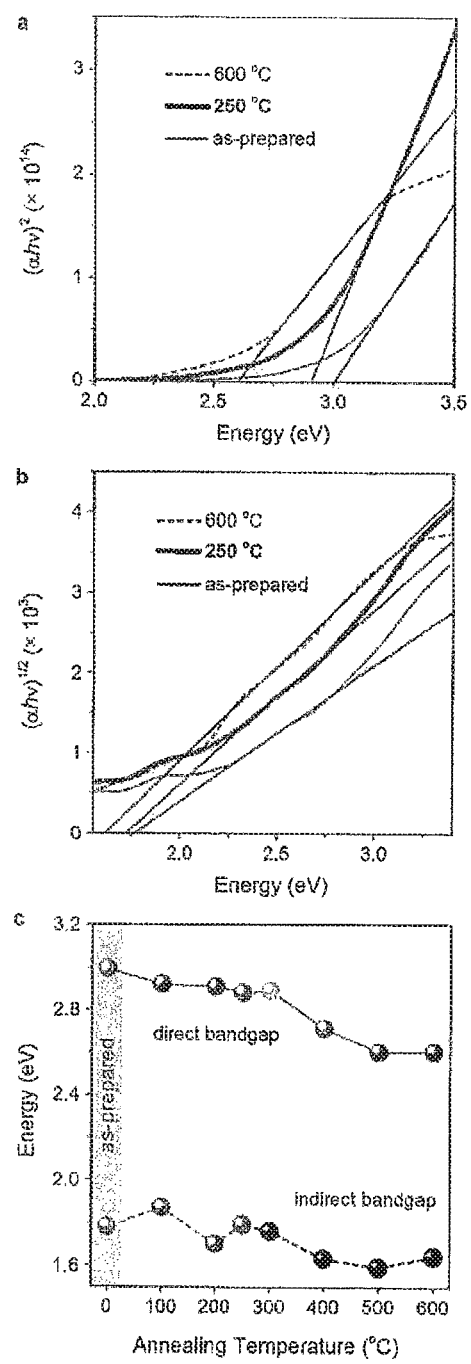
FIG. 8 are plots/optical determinations of band gaps (E$_g$) for Fe$_2$O$_3$ films according to one embodiment of the present invention.

The thin films were subjected to UV-visual light absorption analysis, where $E_g$ can be obtained using Tauc's formula, according to Equation 7 above. (A=absorption coefficient; n=0.5 for direct transitions; n=2 for indirect transitions). FIG. 8 illustrates the energy intercept of the plots, with FIG. 8(a) and FIG. 8(b) demonstrating the direct and indirect bandgaps, respectively. Direct and indirect $E_g$ values were determined in FIG. 8(c) from energy intercepts of the fitted black lines in FIGS. 8(a) and 8(b), respectively. Data points at annealing temperatures at and above 500° C. indicate presence of hematite phase.

Scanning Electron Microscopy

Example 10a

Morphological characterization was carried out with scanning electron microscopy (SEM) using a tungsten-filament SEM (FEI XL 30, accelerating voltage 20 kV).

Figure 9:
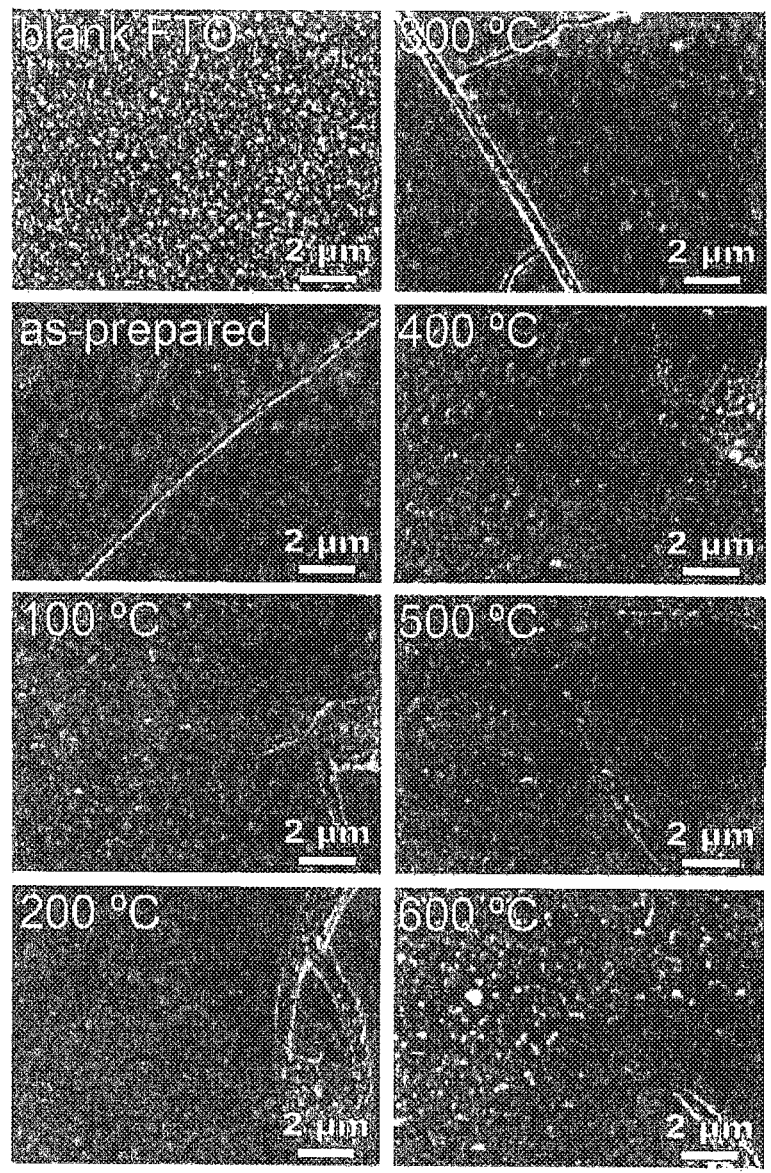
FIG. 9 is a series of scanning electron micrographs of blank FTO and Fe$_2$O$_3$ films according to one embodiment of the present invention.

FIG. 9 shows the electron micrographs of blank FTO and $Fe_2O_3$ films annealed at various temperatures. The films are featureless and conform to the substrate. Cracking due to poor adhesion with the FTO surface occurs after photolysis; this feature is common in all annealed films.

X-Ray Photoelectron Spectroscopy (XPS)

Example 10b

XPS spectra of $Fe_2O_3$ films as-prepared and annealed at various temperatures were obtained by irradiating the films under ultra high vacuum with a beam of X-rays while simultaneously measuring the kinetic energy and number of electrons that escape from the top 1 to 10 nm of the films. Results are shown in FIG. 22.

A PHI VersaProbe 5000-XPS was used to record XPS spectra using a monochromatic Al source, 1486.6 eV, at 49.3 W and beam diameter of 200.0 µm. For each sample, a high sensitivity mode spectrum was taken with a wide binding energy range of 0-1,350 eV to determine the surface elemental composition of the samples. Legend denotes the annealing temperature for respective films. High resolution XPS spectra of the Fe $2p_{1/2}$ and $Fe2p_{3/2}$ regions of the as-prepared sample (Fe $2p_{1/2}$=724.32 $Fe2p_{3/2}$=710.11) and samples annealed at 250° C. (Fe $2p_{1/2}$=724.15 $Fe2p_{3/2}$=710.58) and 600° C. (Fe $2p_{1/2}$=724.15 $Fe2p_{3/2}$=710.60) are consistent with $Fe_2O_3$ (Fe $2p_{1/2}$=724.40 $Fe2p_{3/2}$=710.95).

Electrocatalytic Properties of Single and Mixed Metal Oxide Films

The potential of single and mixed metal oxides as being electrocatalytic for oxygen evolution has been investigated using a variety of electrochemical measurements: cyclic voltammetry, Tafel analysis of photocatalysis at various over potentials and Mott-Schottky analysis of flat band potential.

Current Density as a Function of Annealing Temperature

Example 11

Resultant current density of electrolytic cells constructed with $Fe_2O_3$ films was measured at 0.1 M NaOH(aq) using an applied potential of 1.53 V vs. RHE. Electrochemical data were obtained by cyclic-voltammetry using a three-electrode cell and a scanning potentiometer (Princeton Applied Research Versastat 3). Reference electrodes for measurement in 1.0 M $NaOH_{(aq)}$ (pH=13.6) and 0.1 M $NaOH_{(aq)}$ (pH=13.0) were Hg/HgO fitted with polyethylene frits (Koslow Scientific) and filled with 1.0 M NaOH(aq) and 0.1 M NaOH(aq) respectively. Measurements in 0.1 M $KNO_{3(aq)}$ were performed with a Ag/AgCl reference electrode filled with saturated KCl(aq). Potentials reported herein are referenced to a reversible hydrogen electrode (RHE, $V_{RHE}$=0.000–0.0591·pH). The catalytic anode was the working electrode and it had a platinum counterelectrode.

Figure 12:
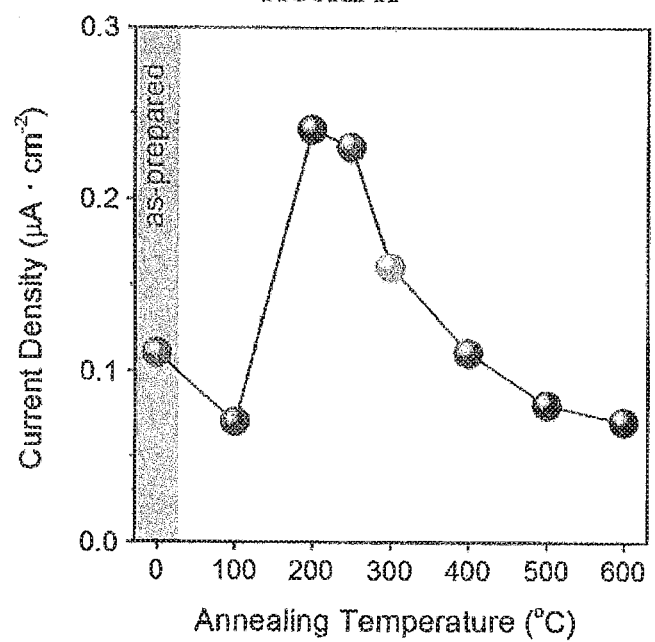
FIG. 12 is a plot of the current density as a function of annealing temperature at 1.53 V vs. RHE according to one embodiment of the present invention.

FIG. 12 depicts the current density for iron oxide films, and demonstrates the superior activities of the films annealed over the 200-300° C. range. Data points at annealing temperatures of 500° C. and higher indicate presence of hematite phase.

Cyclic Voltammetry

Example 12

Figure 18:
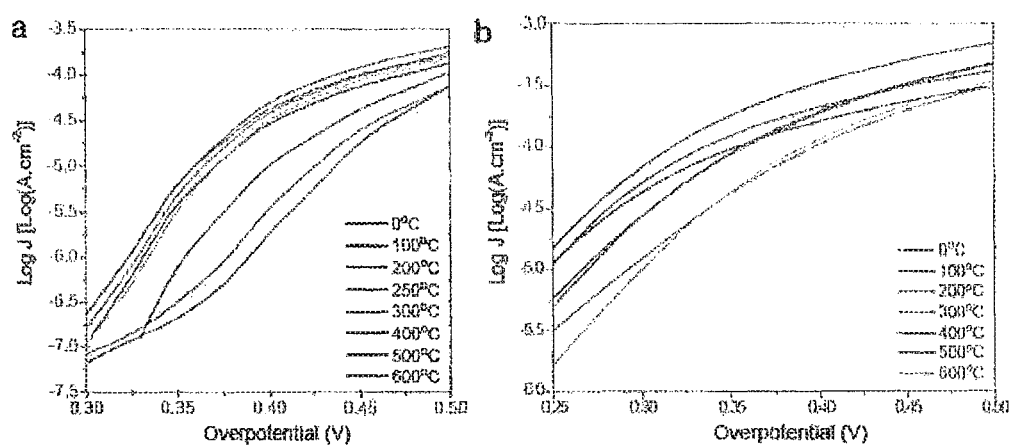
FIG. 18 is the Tafel plots of (a) iron oxide films, and (b) cobalt oxide films, annealed at various temperatures, according to one embodiment of the present invention.

Cyclic voltammetry experiments were run on cobalt and iron oxide films in 0.1M sodium hydroxide. Voltage was applied against a reference electrode such as Ag/AgCl or Hg/HgO, and reported against the reversible hydrogen electrode (RHE) in a linear sweep between 0.4V and 1.7V, and resulting output intensity (overpotential) was measured. Results are depicted in FIG. 18.

Voltammograms for iron oxide films showed the same shape irrespective of the annealing temperature: one reductive wave around 0.4 V vs RHE, attributed to a Fe(III)/Fe(II) couple, and one couple located at the onset of catalysis, attributed to a Fe(IV)/Fe(III) couple.

Analysis of cobalt oxide films resulted in different voltammogram shape depending on whether they were annealed above or below 200° C. Cobalt oxide films annealed below 200° C. presented three reversible couples (with an oxidative wave and a reductive wave): one around 1.1 V vs RHE (I), one around 1.2 V vs RHE (II) and one around 1.5 V vs RHE(III). Cobalt oxide films annealed above 200° C. presented only a reductive wave around 0.6 V vs RHE (IV) and a reversible couple around 1.5 V vs RHE (V). This difference was consistent with the differences seen in UV-visible spectra and sample colors, and confirmed that a new oxide structure arises when the film is annealed above 200° C. Cyclic voltammograms for samples annealed below 200° C. were consistent with the ones reported for amorphous cobalt oxide electrochemically deposited. Couple I would then correspond to the equilibrium between $Co(OH)_2$ and $Co_3O_4$, couple II to the one between $Co(OH)_2$ or $Co_3O_4$ and CoOOH, and couple III to the one between CoOOH and $CoO_2$. This last species was the one from which oxygen was evolved. On the other hand, there was only one reversible couple before the catalytic onset for samples annealed above 200° C. This could once again be consistent with a crystalline $Co_3O_4$ material, where couple V would correspond to its equilibrium with CoOOH, and wave IV would be its reduction into $Co(OH)_2$. The +IV oxidation state formation would then be hidden by the catalytic onset. To summarize, it seemed that catalytic species were at +IV oxidation level in every case.

Amorphous iron oxide films had earlier onsets in terms of potential (see FIG. 10), demonstrating better activity as electrocatalysts than the crystalline iron oxide films. For the cobalt oxide films, the onset potential was not clearly defined, due to the presence of reversible couples in the same region.

Figure 10:
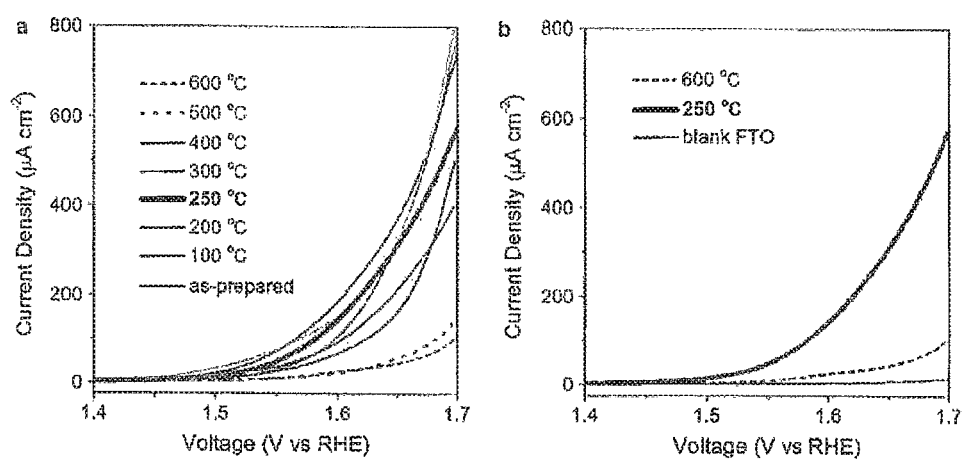
FIG. 10 are cyclic voltammograms of Fe$_2$O$_3$ films on FTO according to one embodiment of the present invention.

FIG. 10 shows the cyclic voltammetry data recorded in 0.1 M NaOH(aq) (pH=12.9) at a scan velocity v=50 mV $s^{-1}$ for films annealed at various temperatures, highlighting the differences in catalytic activities between the most active amorphous α-$Fe_2O_3$ film, hematite, and a blank FTO substrate.

Figure 23A:
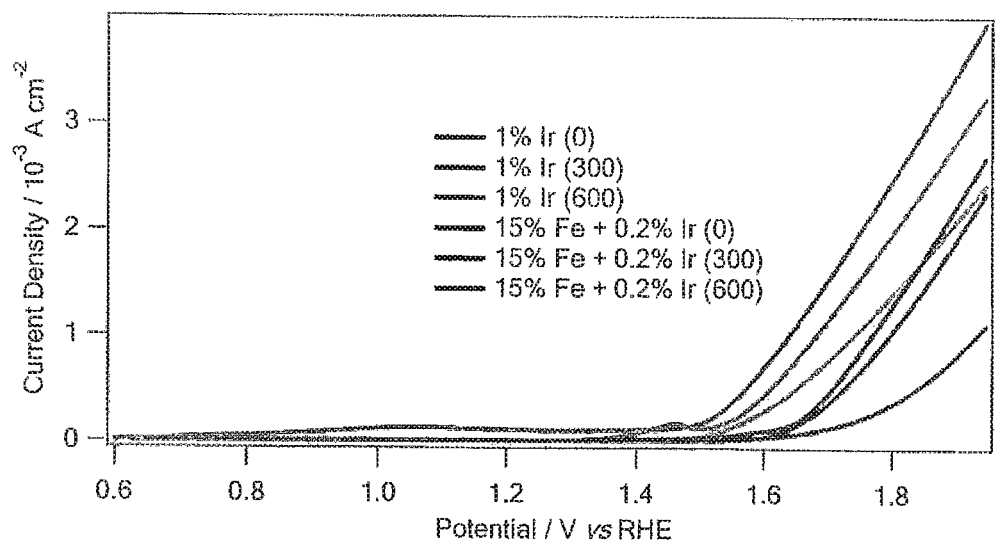
FIG. 23A shows cyclic voltammograms obtained using iridium oxide films produced using three different annealing temperatures, and iridium doped iron oxide films produced at three different annealing temperatures.

FIG. 23A shows the cyclic voltammetry data recorded for iridium oxide and iron oxide containing iridium films annealed at various temperatures, highlighting the differences in catalytic activities between the samples annealed at 300° C. which show optimized catalytic activity, and the as-prepared and 600° C. annealed films.

Figure 23B:
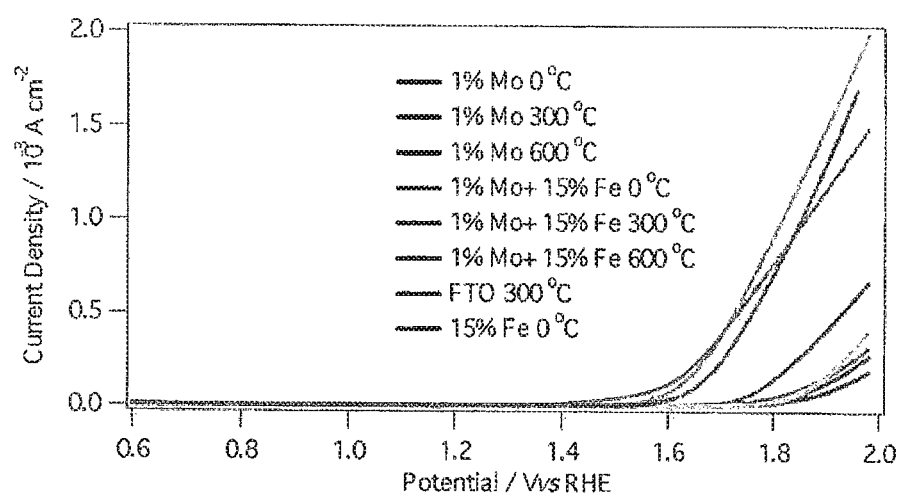
FIG. 23B shows cyclic voltammograms obtained using molybdenum oxide films produced using three different annealing temperatures, and molybdenum doped iron oxide films produced at three different annealing temperatures. Cyclic voltammograms obtained using bare FTO electrode (annealed at 300° C.) and iron oxide film (as-prepared) are also included for reference.

FIG. 23B shows the cyclic voltammetry data recorded for molybdenum oxide films produced using three different annealing temperatures, and molybdenum doped iron oxide films produced at three different annealing temperatures, highlighting the differences in catalytic activities between the samples annealed at 300° C. which show optimized catalytic activity, and the as-prepared and 600° C. annealed films. Cyclic voltammetry data recorded for bare FTO electrode (annealed at 300° C.) and iron oxide film (as-prepared) are also included for reference.

Figure 23C:
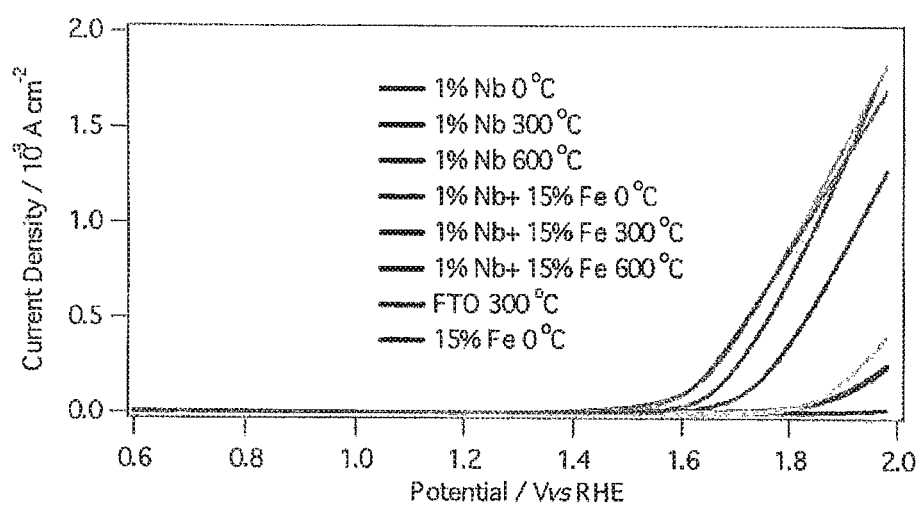
FIG. 23C shows cyclic voltammograms obtained using niobium oxide films produced using three different annealing temperature, and niobium doped iron oxide films produced at three different annealing temperatures. Cyclic voltammograms obtained using bare FTO electrode (annealed at 300° C.) and iron oxide film (as-prepared) are also included for reference.

FIG. 23C shows the cyclic voltammetry data recorded for niobium oxide films produced using three different annealing temperature, and niobium doped iron oxide films produced at three different annealing temperatures. Cyclic voltammetry data recorded for bare FTO electrode (annealed at 300° C.) and iron oxide film (as-prepared) are also included for reference.

Tafel Plots

Example 13

Figure 24:
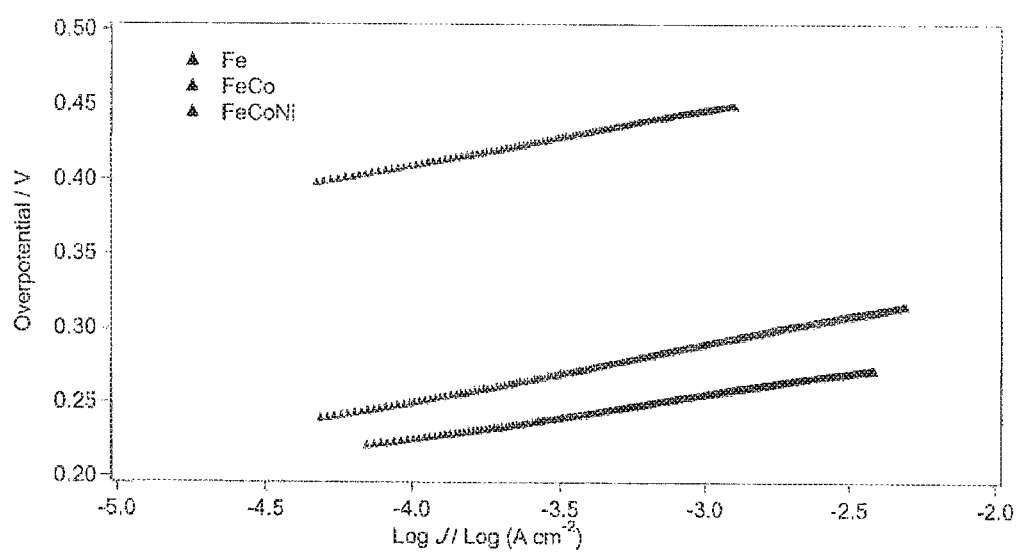
FIG. 24 is the Tafel plots of Fe oxide film, FeCo oxide film and FeCoNi oxide film.

The electrocatalytic behavior of the samples for water oxidation is demonstrated by measuring the current densities as a function of the overpotential (η) in 0.1 M NaOH electrolyte, as is shown in FIG. 24, which shows Tafel plots determined in 0.1 M NaOH (pH=12.9). In this figure, overpotential η=($V_{appl}$–iR)–E(pH 12.9), where $V_{appl}$ is the applied potential vs. NHE, iR denotes the internal voltage drop in the solution and E(pH 12.9) is the anodic potential for oxygen evolution at pH 12.9, namely (1.23–0.059×12.9) V vs NHE, respectively.

Iron oxides are known to exhibit high η values when they catalyze oxygen evolution reactions (OERs), as is the case here for Sample Fe consisting of pure amorphous iron oxide. Appreciable catalytic current is seen only at η>0.4 V, and a benchmark of 1 mA cm$^{-2}$ cannot be observed up to a η of 0.45 V. The low catalytic activity of pure iron oxide in OER can be possibly rationalized by the formation of unstable surface species of higher oxygen coordination number that trigger oxygen evolution on the iron oxide and/or slow hole transfer kinetics at the iron oxide-electrolyte interface.

Addition of Co and/or Ni to the amorphous iron oxide greatly improves the performance of the OER catalysis. For example, compared to Sample Fe, Sample FeCo reduces η by around 160 mV at the same oxygen evolution current density. The catalytic activity of the electrode is further enhanced by incorporating Ni in the oxide mixture (Sample FeCoNi), rendering a of 0.25 V at a current density of 1 mA cm$^{-2}$.

Figure 25:
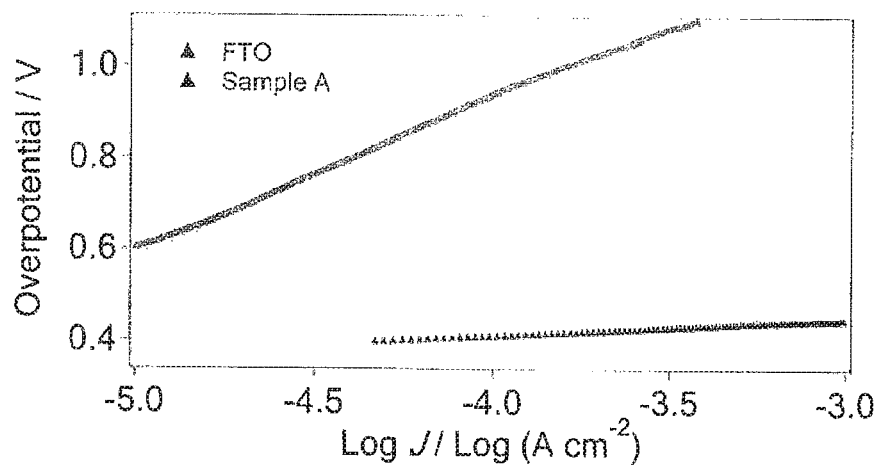
FIG. 25 is the Tafel plots of bare FTO electrode versus iron oxide film.

For comparison, a bare FTO electrode was used as a control and its Tafel plot in the same electrolyte is plotted against Sample Fe in FIG. 25. It is apparent that F-doped tin oxide demonstrates a very low catalytic activity for water oxidation, excluding any current density contributions from FTO glass substrate in the overpotential range of 0.2 to 0.5 V presented in FIG. 24.

Example 14

Figure 26:
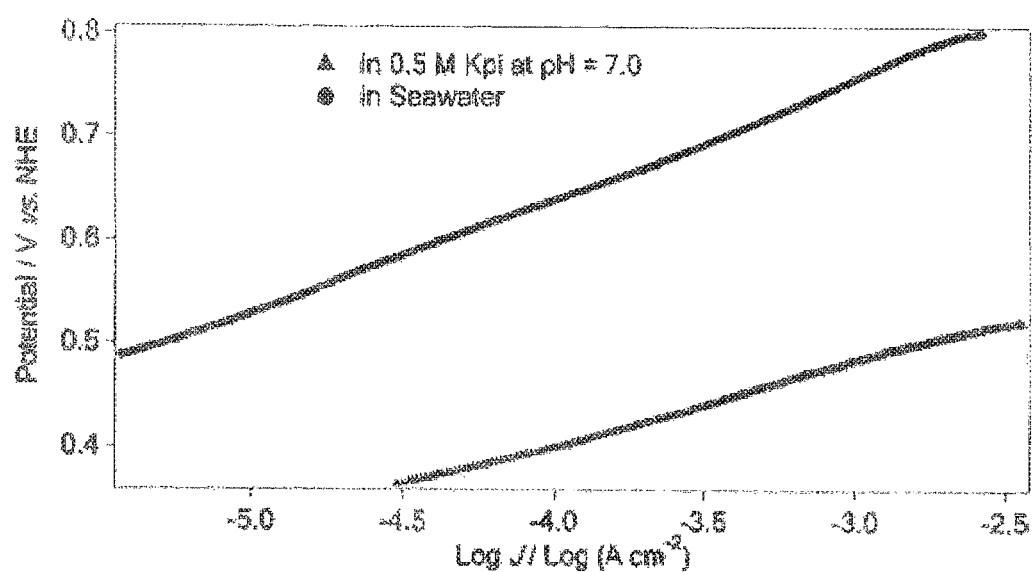
FIG. 26 is the Tafel plots of FeCoNi oxide film under neutral conditions (0.5M KPi, pH7.0) and in seawater (pH 8.4).

The catalytic activity of Sample FeCoNi was also tested under neutral conditions and the Tafel plot is shown in FIG. 26, which shows a Tafel plot for FeCoNi in 0.5 M KPi solution (pH=7.0) and natural seawater (pH=8.4, from Vancouver, British Columbia) corrected for IR drop across the solution. The amorphous nature and/or the composition of the oxides were not compatible with the 0.5 M KPi buffer solution and Sample FeCoNi was found to dissolve in the neutral condition due to the poor adhesion of the film to the FTO substrate. Nonetheless, this was alleviated by simply annealing the film (300° C., in air, 1 hr), which greatly improved the durability of the FeCoNi film to the FTO substrate at neutral conditions, while retaining the amorphous nature of the film. Compared to the value in 0.1 M NaOH, FeCoNi shows a higher overpotential of ~230 mV to 0.48 V at a same oxygen evolution current density of 1 mA cm$^{-2}$. FIG. 26 also shows that FeCoNi retains a moderate performance in natural seawater (pH 8.4, from Vancouver, British Columbia, 49° 18' N, 123° 6' W) and increases η by around 200 mV at the same oxygen evolution current density, as is noticed in another Co-OEC catalyst system.[12] The lower catalytic activity of FeCoNi in seawater might be due to the low conductivity of the seawater and could be potentially reduced by adding electrolytes, such as KOH, KPi or KBi to the solution.

Example 15

The electrocatalytic behavior for water oxidation of the binary and ternary metal oxides listed in Tables 2 and 3 was determined using the same protocol set out in Example 13 above, with the exception that all measurements were performed in aqueous 0.1 M KOH. As these materials are amorphous metal oxides, the oxygen content is not accurately known, and is omitted for clarity in Tables 2 and 3.

TABLE 2

| Binary, Amorphous Metal Oxide Composition | Catalytic Onset Overpotential V | | Tafel Slope mV dec$^{-1}$ | |
|---|---|---|---|---|
| | Average | St. Dev. | Average | St. Dev. |
| Fe | 0.37 | 0.02 | 40 | 4 |
| $Fe_{20}Co_{80}$ | 0.27 | 0.02 | 37 | 4 |
| $Fe_{40}Co_{60}$ | 0.25 | 0.02 | 34 | 3 |
| $Fe_{60}Co_{40}$ | 0.25 | 0.02 | 40 | 7 |
| $Fe_{80}Co_{20}$ | 0.24 | 0.02 | 43 | 9 |
| Co | 0.26 | 0.02 | 42 | 2 |
| $Fe_{80}Ni_{20}$ | 0.27 | 0.03 | 33 | 3 |
| $Fe_{60}Ni_{40}$ | 0.26 | 0.01 | 31 | 3 |
| $Fe_{40}Ni_{60}$ | 0.25 | 0.01 | 34 | 8 |
| $Fe_{20}Ni_{80}$ | 0.23 | 0.01 | 46 | 12 |
| Ni | 0.25 | 0.01 | 73 | 6 |
| $Co_{20}Ni_{80}$ | 0.25 | 0.01 | 80 | 7 |
| $Co_{40}Ni_{60}$ | 0.25 | 0.01 | 73 | 6 |
| $Co_{60}Ni_{40}$ | 0.23 | 0.01 | 60 | 2 |
| $Co_{80}Ni_{20}$ | 0.23 | 0.01 | 63 | 3 |
| $Co_{80}Al_{20}$ | 0.26 | 0.01 | 42 | 1 |
| $Co_{60}Al_{40}$ | 0.27 | 0.01 | 46 | 3 |
| $Co_{40}Al_{60}$ | 0.27 | 0.01 | 44 | 3 |
| $Co_{20}Al_{80}$ | 0.27 | 0.01 | 39 | 1 |
| $Ni_{80}Al_{20}$ | 0.28 | 0.02 | 61 | 1 |
| $Ni_{60}Al_{40}$ | 0.26 | 0.01 | 30 | 3 |
| $Ni_{40}Al_{60}$ | 0.3 | 0.01 | 51 | 7 |
| $Ni_{20}Al_{80}$ | 0.29 | 0.01 | 12 | 2 |
| $Fe_{80}Al_{20}$ | 0.31 | 0.02 | 32 | 6 |
| $Fe_{60}Al_{40}$ | 0.31 | 0.02 | 37 | 1 |
| $Fe_{40}Al_{60}$ | 0.3 | 0.01 | 36 | 4 |
| $Fe_{20}Al_{80}$ | 0.29 | 0.01 | 34 | 4 |
| Al | 0.4 | 0.08 | 89 | 19 |
| $Fe_{98}Ce_2$ | 0.32 | 0.01 | 40 | 4 |
| $Fe_{95}Ce_5$ | 0.32 | 0.01 | 32 | 1 |
| $Fe_{90}Ce_{10}$ | 0.33 | 0.01 | 32 | 1 |
| $Fe_{80}Ce_{20}$ | 0.33 | 0.02 | 32 | 1 |
| $Fe_{70}Ce_{30}$ | 0.32 | 0.01 | 36 | 1 |
| $Fe_{60}Ce_{40}$ | 0.32 | 0.01 | 37 | 2 |
| $Fe_{50}Ce_{50}$ | 0.31 | 0.01 | 40 | 2 |
| Ce | 0.38 | 0.01 | 72 | 15 |
| $Fe_{80}Mo_{20}$ | 0.32 | 0.01 | 43 | 2 |
| $Fe_{60}Mo_{40}$ | 0.33 | 0.01 | 46 | 1 |
| $Fe_{40}Mo_{60}$ | 0.33 | 0.01 | 49 | 3 |
| Mo | 0.35 | 0.03 | 58 | 9 |
| $Fe_{80}Cu_{20}$ | 0.29 | 0.01 | 42 | 4 |
| $Fe_{60}Cu_{40}$ | 0.29 | 0.01 | 46 | 4 |
| $Fe_{40}Cu_{60}$ | 0.3 | 0.02 | 50 | 15 |
| $Fe_{20}Cu_{80}$ | 0.31 | 0 | 45 | 5 |
| Cu | 0.33 | 0.02 | 54 | 14 |
| $Fe_{80}Ir_{20}$ | 0.21 | 0.01 | 50 | 2 |
| $Fe_{60}Ir_{40}$ | 0.21 | 0.01 | 44 | 3 |
| $Fe_{40}Ir_{60}$ | 0.2 | 0.01 | 41 | 1 |
| $Fe_{20}Ir_{80}$ | 0.22 | 0.01 | 44 | 4 |
| Ir | 0.21 | 0.01 | 80 | 13 |
| $Fe_{99.5}Mn_{0.5}$ | 0.38 | 0.04 | 32 | 7 |
| $Fe_{98}Mn_2$ | 0.38 | 0.01 | 33 | 5 |
| $Fe_{96}Mn_4$ | 0.37 | 0.01 | 32 | 3 |
| $Fe_{94}Mn_6$ | 0.37 | 0.01 | 33 | 4 |
| $Fe_{92}Mn_8$ | 0.36 | 0.03 | 35 | 5 |
| $Fe_{90}Mn_{10}$ | 0.36 | 0.01 | 34 | 2 |
| $Fe_{80}Mn_{20}$ | 0.36 | 0.02 | 37 | 4 |
| $Fe_{60}Mn_{40}$ | 0.35 | 0.01 | 46 | 2 |
| $Fe_{40}Mn_{60}$ | 0.35 | 0.02 | 42 | 3 |
| Mn | 0.5 | 0.01 | 55 | 4 |
| $Fe_{99.5}Sn_{0.5}$ | 0.39 | 0.03 | 57 | 7 |
| $Fe_{98}Sn_2$ | 0.33 | 0.01 | 48 | 15 |
| $Fe_{96}Sn_4$ | 0.37 | 0.01 | 35 | 4 |
| $Fe_{94}Sn_6$ | 0.38 | 0.02 | 42 | 5 |
| $Fe_{92}Sn_8$ | 0.39 | 0.02 | 33 | 2 |
| $Fe_{90}Sn_{10}$ | 0.39 | 0.01 | 35 | 3 |
| $Fe_{99.5}Nb_{0.5}$ | 0.38 | 0.02 | 39 | 2 |
| $Fe_{98}Nb_2$ | 0.4 | 0.01 | 47 | 3 |
| $Fe_{96}Nb_4$ | 0.4 | 0.03 | 49 | 4 |
| $Fe_{94}Nb_6$ | 0.39 | 0.01 | 48 | 5 |
| $Fe_{92}Nb_8$ | 0.41 | 0.02 | 55 | 3 |
| $Fe_{90}Nb_{10}$ | 0.41 | 0.01 | 41 | 3 |

TABLE 3

| Ternary, Amorphous Metal Oxide Composition | Catalytic Onset Overpotential V | | Tafel Slope mV dec$^{-1}$ | |
|---|---|---|---|---|
| | Average | St. Dev. | Average | St. Dev. |
| $Fe_{20}Co_{20}Ni_{60}$ | 0.23 | 0.01 | 52 | 5 |
| $Fe_{20}Co_{40}Ni_{40}$ | 0.23 | 0 | 49 | 4 |
| $Fe_{20}Co_{60}Ni_{20}$ | 0.23 | 0.01 | 47 | 5 |
| $Fe_{40}Co_{20}Ni_{40}$ | 0.23 | 0.01 | 43 | 1 |
| $Fe_{40}Co_{40}Ni_{20}$ | 0.24 | 0 | 40 | 1 |
| $Fe_{60}Co_{20}Ni_{20}$ | 0.25 | 0 | 39 | 2 |
| $Fe_{20}Al_{20}Ni_{60}$ | 0.27 | 0.01 | 20 | 2 |
| $Fe_{20}Al_{40}Ni_{40}$ | 0.3 | 0.02 | 9 | 2 |
| $Fe_{20}Al_{60}Ni_{20}$ | 0.3 | 0.01 | 12 | 2 |
| $Fe_{40}Al_{20}Ni_{40}$ | 0.3 | 0.01 | 16 | 1 |
| $Fe_{40}Al_{40}Ni_{20}$ | 0.31 | 0.01 | 23 | 3 |
| $Fe_{60}Al_{20}Ni_{20}$ | 0.32 | 0.01 | 27 | 1 |
| $Al_{20}Co_{20}Ni_{60}$ | 0.3 | 0.01 | 60 | 1 |
| $Al_{20}Co_{40}Ni_{40}$ | 0.27 | 0.01 | 52 | 1 |
| $Al_{20}Co_{60}Ni_{20}$ | 0.26 | 0.01 | 49 | 2 |
| $Al_{40}Co_{20}Ni_{40}$ | 0.28 | 0 | 57 | 1 |
| $Al_{40}Co_{40}Ni_{20}$ | 0.27 | 0.01 | 50 | 2 |
| $Al_{60}Co_{20}Ni_{20}$ | 0.28 | 0 | 52 | 2 |
| $Al_{20}Co_{20}Fe_{60}$ | 0.27 | | 42 | |
| $Al_{20}Co_{40}Fe_{40}$ | 0.26 | | 36 | |
| $Al_{20}Co_{60}Fe_{20}$ | 0.25 | | 35 | |
| $Al_{40}Co_{20}Fe_{40}$ | 0.28 | | 47 | |
| $Al_{40}Co_{40}Fe_{20}$ | 0.26 | | 32 | |
| $Al_{60}Co_{20}Fe_{20}$ | 0.26 | | 39 | |

The above data suggest some general trends. For example, addition of Fe tends to improve the Tafel slopes (catalytic performance) of other metal oxides. For example, amorphous $NiO_x$ exhibits a Tafel slope of 73+/−6 mV dec$^{-1}$. Addition of Fe to the catalyst results in slopes better than 40 mV dec$^{-1}$ (e.g. 31 mV dec$^{-1}$ for $Fe_{60}Ni_{40}O_x$). Also, when starting from $FeO_x$, the addition of more electron rich elements (Co, Ni, Cu, Al, Ir) results in significant decreases in activation overpotential, and the addition of more electron deficient elements (Mo, Mn, Nb) results in small, but measurable decreases in activation overpotential. Iron can also be added to promising ternary catalysts to further improve their behavior, e.g., $Ni_{60}Al_{40}O_x$ produced an activation overpotential of 0.26 V and a Tafel slope of 30 mV dec$^{-1}$, but addition of Fe to the sample $Fe_{20}Al_{20}Ni_{60}O_x$ produced an activation overpotential of 0.27 V and a slope of 20 mV dec$^{-1}$.

In addition, aluminum appears to be a promising additive to further improve Tafel slopes, e.g., $Fe_{20}Al_{40}Ni_{40}$ has a Tafel slope of 9 mV dec-1, and several other Al-containing catalysts exhibit slopes better than 15 mV dec-1.

Electrochemical Impedance Spectroscopy Analysis

Example 16

The AC impedance measurements of the $Fe_2O_3$ films were recorded with a potentiostat/galvanostat (Gamry EIS 300 with onboard controller PCI4G300-49085 using Gamry Instrument Framework 5.61). The applied bias voltage was varied vs. the reference electrode and the ac amplitude rms was 10 mV between the Pt counter electrode and the $FTO/Fe_2O_3$ working electrode. The frequency range explored was 0.1 to 1000 Hz. The following relationship was used to build Mott-Schottky plots for each sample (Equation 10):

$$\frac{1}{C^2} = \frac{2}{\varepsilon\varepsilon_0 A^2 eN_D}\left(V - V_{fb} - \frac{k_B T}{e}\right)$$

Where C represents the capacitance, e is the dielectric constant of iron oxide (12.5),[107] $\varepsilon_0$ is the dielectric constant of a vacuum (8.854×10$^{-14}$ C·V$^1$·cm$^{-1}$). A is the area of the film in cm, e is the electronic charge (1.602×10$^{-19}$ C), $N_D$ is the donor density (cm$^{-3}$), $k_B$ is Boltzmann's constant (1.380×10$^{-23}$ J·K$^{-1}$), T is the temperature dependence of the plot, $V_{fb}$, the flat band potential (V) and V is the applied potential (V). Potentiostatic impedance at 1000 Hz performed at voltages ranging from 0 to 1.1 V vs RHE gave a series of Nyquist plots which were fitted with the simple circuit:

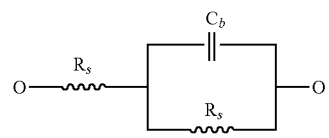

Figure 13:
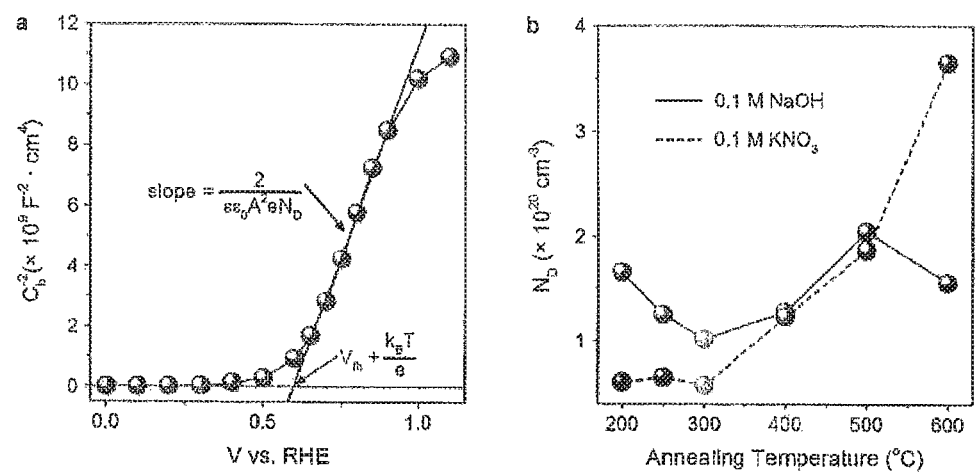
FIG. 13 is a (a) Mott-Schottky plot and (b) a plot of charge carrier density of amorphous metal oxide films in neutral and basic media according to one embodiment of the present invention.
Figure 14:
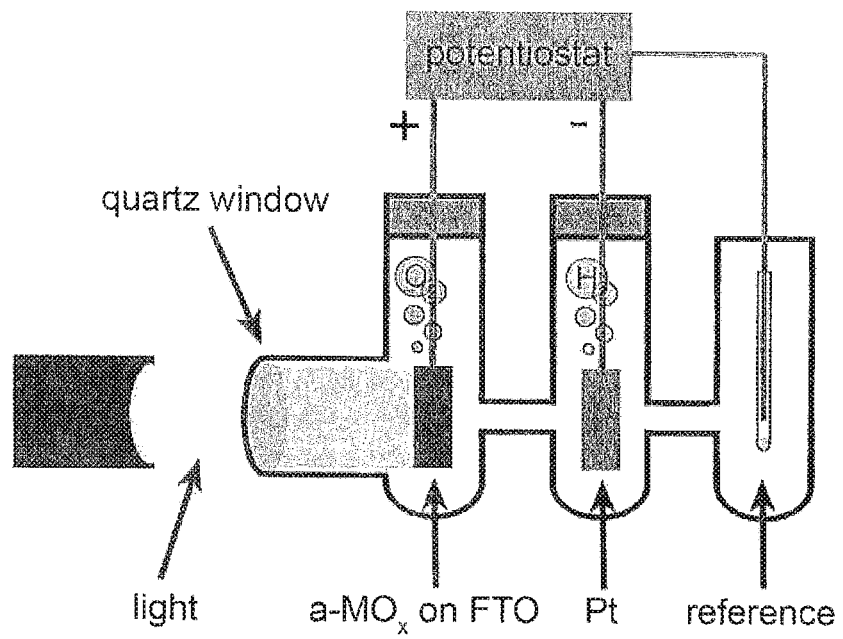
FIG. 14 is a schematic of a photo-electrocatalytic cell for water oxidation according to one embodiment of the invention.

The $C_b$ values were plotted against the applied voltage to give Mott-Schottky plots shown in FIG. 13a. The space charge capacitance vs. electrode potential for the $Fe_2O_3$ thin film annealed at 500° C. shows the determination of the flat band potential ($V_{fb}$) and majority charge carrier density ($N_D$). All of the $Fe_2O_3$ thin films in this study show a positive slope in the Mott-Schottky plots, indicating n-type semiconductor properties, irrespective of annealing temperature.

The data in the Mott-Schottky plot is then used to derive the majority charge carrier density ($N_D$) in 0.1 M NaOH and 0.1 M $KNO_3$, as shown in FIG. 13b, to compare solvent effects. Donor densities of the $Fe_2O_3$ films are on the same order of magnitude, as determined from the Mott Schottky plots. Disparate catalytic activities are therefore not ascribed in any significant manner to a modulation of the charge carrier concentrations. Annealing temperatures of 500° C. or greater indicate presence of hematite phase.

Photocatalytic Activity of the Electrocatalyst

Example 17

The electrocatalytic activity, namely the hydrolysis of water, was evaluated by fluorimetry. Measurement of dioxygen production evolution were monitored every 10 s with an optical probe (Ocean Optics FOXY-OR125-AFMG) and a multifrequency phase fluorimeter (Ocean Optics MFPF-100). Raw data from the sensor was collected by the TauTheta Host Program and then converted into calibrated $O_2$ sensor readings in "% $O_2$" by the Ocean Optics I Sensors application.

Figure 11:
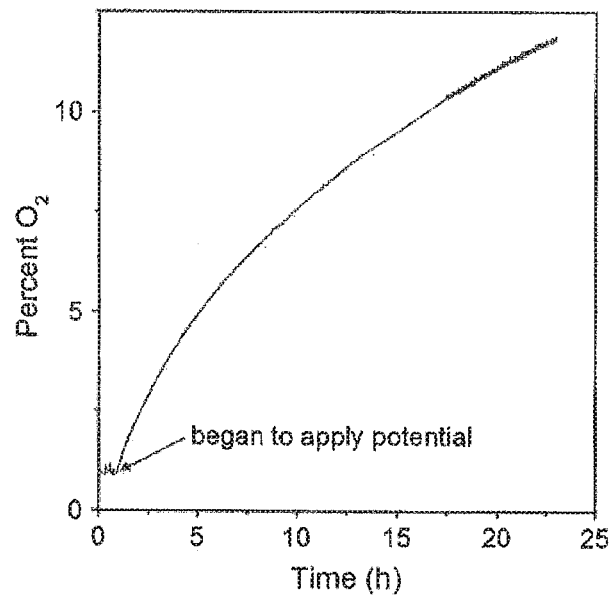
FIG. 11 is a plot of the production of O$_2$ during controlled-potential electrolysis using an $\alpha$-Fe$_2$O$_3$ sample annealed at 250° C. according to one embodiment of the present invention.

FIG. 11 shows the evolution of dioxygen during controlled-potential electrolysis using an α-$Fe_2O_3$ sample annealed at 250° C. on FTO. Catalytic wave generation of dioxygen was confirmed by spectroscopically monitoring dioxygen evolution with a fluoroescence optical probe at an applied potential of 2.0 V vs. RHE in 1.0 M NaOH(aq).

Example 18

Photocatalytic studies were performed on iron oxide films. Four different films were tested: a film composed of 5 layers of amorphous iron oxide annealed at 250° C. (sample A1); a film composed of 5 layers of amorphous iron oxide annealed at 400° C. (sample A2); a film composed of 5 layers of crystalline iron oxide annealed at 600° C. (sample C); a film composed of 4 layers of crystalline iron oxide annealed at 600° C. and one layer of amorphous iron oxide annealed at 250° C. on top of them (sample CA).

Cyclic voltammetry and chronoamperometry experiments were then performed on the films, in the dark and under a one sun equivalent of illumination.

Figure 19:
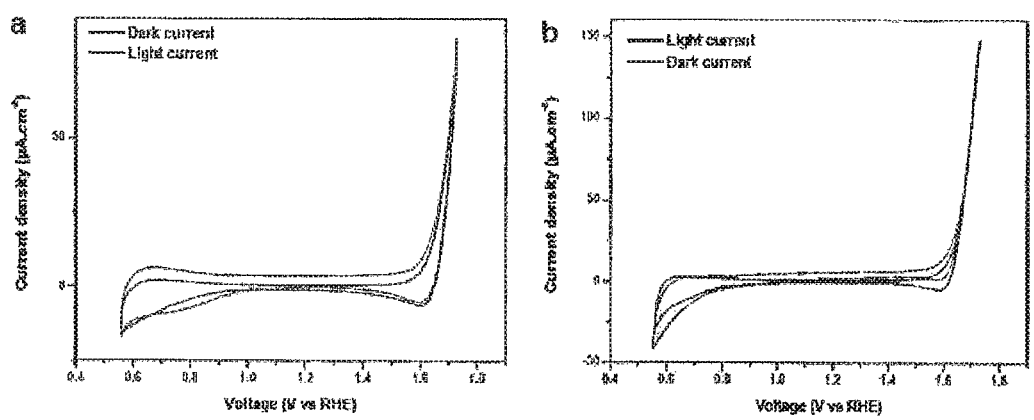
FIG. 19 is the cyclic voltammograms acquired in light (1 sun equivalent) and dark conditions for (a) a crystalline iron oxide film, and (b) a mixed crystalline and amorphous iron oxide film, according to one embodiment of the present invention.

Cyclic voltammograms were acquired in 0.1M NaOH. For amorphous films A1 and A2, no clear difference appeared between the voltammograms acquired in the dark and under illumination. Samples C and CA, an additional anodic current appeared when the sample was exposed to light, indicating that a photoelectrochemical process was taking place at the film surface. Cyclic voltammetry results are presented in FIG. 19.

Figure 20:
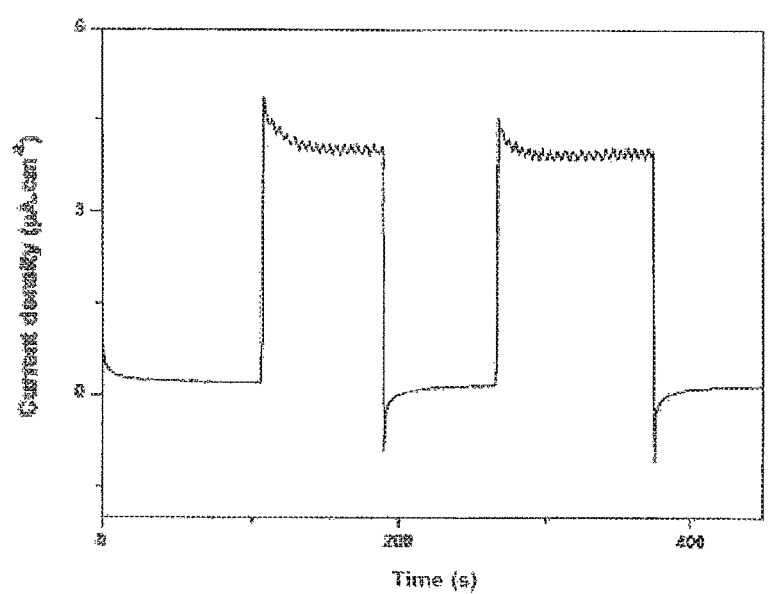
FIG. 20 is a graph of the chronoamerometry data obtained for a mixed crystalline and amorphous iron oxide film, according to one embodiment of the present invention.

Chronoamperometry data obtained for CA sample at 1.53V versus RHE are shown in FIG. 20 and data obtained for each sample at the same voltage are shown in FIG. 21. Samples C and CA demonstrate a rise in current when under illumination, demonstrating photocatalytic behaviour. Amorphous samples A1 and A2 gave lower photocurrents. Current density values produced by each sample at 1.23V, 1.53V and 1.73V versus RHE are compiled in FIG. 21.

Example 19

Figure 27:
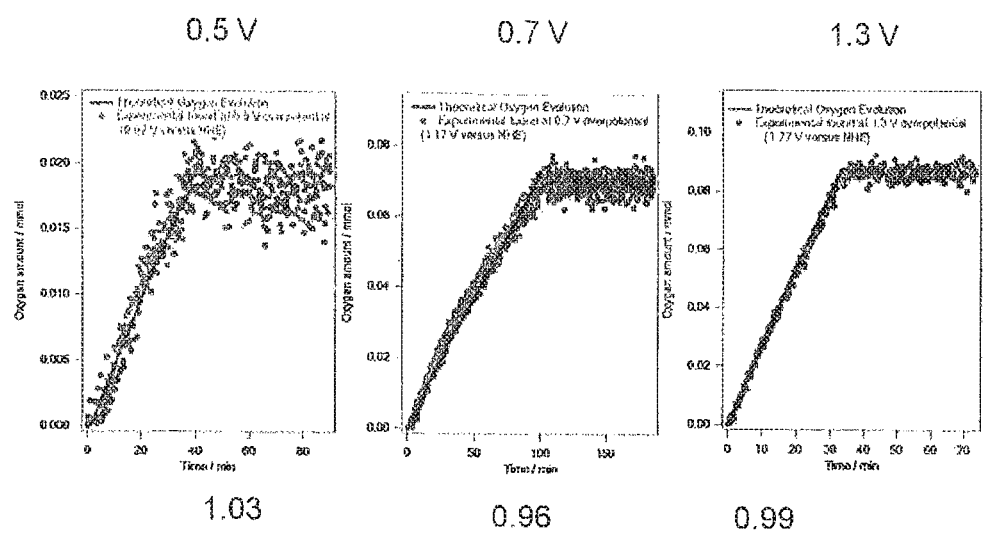
FIG. 27 is the O$_2$ production as measured by fluorescent sensor versus theoretical O$_2$ production.

As shown in FIG. 27, the production of $O_2$ was confirmed by the evolution of $O_2$ bubbles off the anode immediately after the start of chronoamperometry experiments at $\eta$=0.5V, 0.7 V and 1.3V. $O_2$ production amount measured by fluorescent sensor (red dots) and theoretical amount of $O_2$ produced (black line) based on a Faradaic efficiency of 100%. As shown in FIG. 27a, electrolysis was carried out in 0.1 M NaOH at a $\eta$=0.5 V, i.e. a potential of 0.97 V vs NHE. As shown in FIG. 27b, electrolysis was carried out in 0.1 M NaOH at a $\eta$=0.7 V, i.e. a potential of 1.17 V vs NHE. As shown in FIG. 27c, electrolysis was carried out in 0.1 M NaOH at a $\eta$=1.3 V, i.e. a potential of 1.77 V vs NHE.

The Faradaic efficiency of the FeCo oxide catalyst was measured with a fluorescence-based $O_2$ sensor. The experimentally found $O_2$ amount is plotted against experimental time, together with the theoretical values of $O_2$ evolution amount based on a Faradaic efficiency of unity (FIG. 27). After passing a charge of 30 C through the anode, 76 μmol $O_2$ were generated in the system, consistent with the expected amount of 78 μmol, confirming a Faradaic efficiency close to 100%. Measurements of dioxygen evolution were monitored every 10 s with an optical probe (Ocean Optics FOXY-OR125-AFMG) and a multifrequency phase fluorimeter (Ocean Optics MFPF-100). Raw data from the sensor was collected by the TauTheta Host Program and then converted into the appropriate calibrated $O_2$ sensor readings in "% $O_2$" by the OOISensors application.

Other Embodiments

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A method of forming an electrode comprising an electrocatalytic amorphous metal oxide film on a substrate, the method comprising the steps of:
   i. providing the substrate;
   ii. coating the substrate with a metallo-organic precursor solution, wherein the metallo-organic precursor contains a photosensitive ligand;
   iii. converting the metallo-organic precursor to zero oxidation state metal by photolysis under UV light radiation; and
   iv. oxidizing the zero oxidation state material to a metal oxide to form the amorphous metal oxide film on the substrate to form the electrode.

2. The method according to claim 1, wherein the metallo-organic precursor solution comprises a precursor selected from the group consisting of an iron precursor, a cobalt precursor, a nickel precursor, an aluminum precursor, a cerium precursor, a molybdenum precursor, a copper precursor, an iridium precursor, a manganese precursor, a tin precursor, a niobium precursor, and mixtures thereof.

3. The method according to claim 1, wherein the precursor is a 2-ethylhexanoate derivative of the metal.

4. The method according to claim 1, further comprising the step of tuning the properties of the electrode.

5. The method according to claim 4, wherein the tuning step comprises annealing the metal oxide film.

6. The method according to claim 1, wherein the amorphous metal oxide film formed in step (iv) comprises a single metal oxide selected from the group consisting of iron oxide, cobalt oxide, nickel oxide, ruthenium oxide, and iridium oxide.

7. The method according to claim 1, wherein the amorphous metal oxide film formed in step (iv) comprises a binary metal oxide system selected from the group consisting of iron/cobalt, iron/nickel, cobalt/nickel, cobalt/aluminum, nickel/aluminum, iron/aluminum, iron/cerium, iron/molybdenum, iron/copper, iron/iridium, iron/manganese, iron/tin, and iron/niobium.

8. The method according to claim 1, wherein the amorphous metal oxide film formed in step (iv) comprises a ternary metal oxide system selected from the group consisting of iron/cobalt/nickel, iron/aluminum/nickel, aluminum/cobalt/nickel, and aluminum/cobalt/iron.

9. The method according to claim 1, wherein the amorphous metal oxide film formed in step (iv) comprises a doped metal oxide selected from the group consisting of iridium-doped iron oxide, niobium-doped iron oxide, and molybdenum-doped iron oxide.

* * * * *